US008805689B2

(12) United States Patent
Ramaswamy et al.

(10) Patent No.: US 8,805,689 B2
(45) Date of Patent: Aug. 12, 2014

(54) METHODS AND APPARATUS TO GENERATE AND USE CONTENT-AWARE WATERMARKS

(75) Inventors: Arun Ramaswamy, Tampa, FL (US); Robert A. Luff, Wittman, MD (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 902 days.

(21) Appl. No.: 12/101,738

(22) Filed: Apr. 11, 2008

(65) Prior Publication Data

US 2009/0256972 A1    Oct. 15, 2009

(51) Int. Cl.
| | | |
|---|---|---|
| *G10L 21/00* | (2013.01) | |
| *G06Q 30/02* | (2012.01) | |
| *H04H 60/37* | (2008.01) | |
| *H04H 60/58* | (2008.01) | |
| *H04H 60/48* | (2008.01) | |
| *H04H 20/31* | (2008.01) | |

(52) U.S. Cl.
CPC .............. *G06Q 30/02* (2013.01); *H04H 60/37* (2013.01); *H04H 60/58* (2013.01); *H04H 60/48* (2013.01); *H04H 20/31* (2013.01); *H04H 2201/50* (2013.01)
USPC ............... 704/273; 725/34; 725/32; 725/110; 715/723; 715/203; 713/176; 713/153; 709/217; 707/769; 705/14.14; 705/14.1; 704/211; 704/270; 704/205; 382/100

(58) Field of Classification Search
USPC ...................... 715/723, 203; 725/110, 34, 32; 704/723, 203, 273, 270, 211, 205; 713/176, 153; 709/217; 707/769; 705/14.14, 14.1; 382/100
See application file for complete search history.

(56) References Cited

U.S. PATENT DOCUMENTS

| | | | |
|---|---|---|---|
| 5,572,246 A | 11/1996 | Ellis et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,612,729 A | 3/1997 | Ellis et al. | |
| 5,621,454 A | 4/1997 | Ellis et al. | |
| 6,122,403 A | 9/2000 | Rhoads | |
| 6,226,387 B1 | 5/2001 | Tewfik et al. | |
| 6,272,176 B1 | 8/2001 | Srinivasan | |
| 6,314,518 B1 | 11/2001 | Linnartz | |
| 6,374,036 B1 | 4/2002 | Ryan et al. | |
| 6,377,965 B1 * | 4/2002 | Hachamovitch et al. ..... | 715/203 |

(Continued)

FOREIGN PATENT DOCUMENTS

| | | |
|---|---|---|
| WO | 0064094 | 10/2000 |
| WO | 0237498 | 5/2002 |

OTHER PUBLICATIONS

International Search Report corresponding to International Patent Application No. PCT/US2008/060101, mailed Feb. 27, 2009, 3 pages.

(Continued)

*Primary Examiner* — Michael Colucci
(74) *Attorney, Agent, or Firm* — Hanley, Flight & Zimmerman, LLC

(57) ABSTRACT

Methods and apparatus to generate and use content-aware watermarks are disclosed herein. In a disclosed example method, media composition data is received and at least one word present in an audio track of the media composition data is selected. The word is then located in a watermark.

29 Claims, 13 Drawing Sheets

(56) References Cited

U.S. PATENT DOCUMENTS

| | | |
|---|---|---|
| 6,411,725 B1 | 6/2002 | Rhoads |
| 6,480,825 B1* | 11/2002 | Sharma et al. ............... 704/270 |
| 6,614,844 B1 | 9/2003 | Proehl |
| 6,647,129 B2 | 11/2003 | Rhoads |
| 6,690,813 B2 | 2/2004 | Kimura et al. |
| 6,724,914 B2 | 4/2004 | Brundage et al. |
| 6,738,495 B2 | 5/2004 | Rhoads et al. |
| 6,741,684 B2 | 5/2004 | Kaars |
| 6,892,175 B1* | 5/2005 | Cheng et al. ............... 704/205 |
| 6,901,606 B2 | 5/2005 | Wright et al. |
| 6,912,294 B2 | 6/2005 | Wang et al. |
| 6,973,574 B2 | 12/2005 | Mihcak et al. |
| 6,975,746 B2 | 12/2005 | Davis et al. |
| 6,983,051 B1 | 1/2006 | Rhoads |
| 6,988,201 B1* | 1/2006 | Xu et al. ............... 713/176 |
| 6,999,598 B2* | 2/2006 | Foote et al. ............... 382/100 |
| 7,007,166 B1 | 2/2006 | Moskowitz et al. |
| 7,017,045 B1 | 3/2006 | Krishnamachari |
| 7,095,871 B2* | 8/2006 | Jones et al. ............... 382/100 |
| 7,142,691 B2 | 11/2006 | Levy |
| 7,184,571 B2 | 2/2007 | Wang et al. |
| 7,224,819 B2 | 5/2007 | Levy et al. |
| 7,263,203 B2 | 8/2007 | Rhoads et al. |
| 7,269,734 B1 | 9/2007 | Johnson et al. |
| 7,289,643 B2 | 10/2007 | Brunk et al. |
| 7,315,621 B2 | 1/2008 | Noridomi et al. |
| 7,316,025 B1 | 1/2008 | Aijala et al. |
| 7,369,675 B2 | 5/2008 | Pelly et al. |
| 7,460,991 B2* | 12/2008 | Jones et al. ............... 704/211 |
| 7,983,441 B2* | 7/2011 | Vestergaard et al. ......... 382/100 |
| 8,015,200 B2* | 9/2011 | Seiflein et al. ............... 707/769 |
| 8,332,478 B2* | 12/2012 | Levy et al. ............... 709/217 |
| 8,528,033 B2* | 9/2013 | McCarthy et al. ............ 725/110 |
| 2002/0145622 A1* | 10/2002 | Kauffman et al. ............ 345/723 |
| 2002/0162118 A1* | 10/2002 | Levy et al. ............... 725/110 |
| 2002/0188841 A1* | 12/2002 | Jones et al. ............... 713/153 |
| 2002/0191810 A1 | 12/2002 | Fudge et al. |
| 2003/0110078 A1* | 6/2003 | Chang et al. ............... 705/14 |
| 2003/0133592 A1 | 7/2003 | Rhoads |
| 2004/0006469 A1 | 1/2004 | Kang |
| 2004/0028257 A1 | 2/2004 | Proehl |
| 2004/0073916 A1 | 4/2004 | Petrovic et al. |
| 2004/0078188 A1 | 4/2004 | Gibbon et al. |
| 2004/0125125 A1 | 7/2004 | Levy |
| 2004/0216173 A1 | 10/2004 | Horoszowski et al. |
| 2005/0053235 A1 | 3/2005 | Clark et al. |
| 2005/0141704 A1 | 6/2005 | Van Der Veen |
| 2005/0144006 A1* | 6/2005 | Oh ............... 704/273 |
| 2006/0059509 A1* | 3/2006 | Huang et al. ............... 725/32 |
| 2006/0159303 A1 | 7/2006 | Davis et al. |
| 2006/0212705 A1 | 9/2006 | Thommana et al. |
| 2006/0224452 A1* | 10/2006 | Ng ............... 705/14 |
| 2006/0285722 A1 | 12/2006 | Moskowitz et al. |
| 2007/0031000 A1 | 2/2007 | Rhoads et al. |
| 2007/0047763 A1 | 3/2007 | Levy |
| 2007/0199017 A1 | 8/2007 | Cozen et al. |
| 2007/0230739 A1 | 10/2007 | Johnson et al. |
| 2007/0266252 A1 | 11/2007 | Davis et al. |
| 2007/0274611 A1 | 11/2007 | Rodriguez et al. |
| 2007/0291848 A1 | 12/2007 | Aijala et al. |
| 2008/0052516 A1 | 2/2008 | Tachibana et al. |
| 2008/0066098 A1* | 3/2008 | Witteman et al. ............... 725/34 |
| 2000/9158318 | 6/2009 | Levy |

OTHER PUBLICATIONS

Written Opinion of the International Searching Authority corresponding to International Patent Application No. PCT/US2008/060101, mailed Feb. 27, 2009, 4 pages.

"Digital Copyright Protection for Multimedia Documents," Digital Copyright Technologies, retrieved on Aug. 12, 2010 from http://vision.unige.ch/publications/postscript/99/HerrigelPun_telecom99.pdf (4 pages).

"Digital Watermarking of Raw and Compressed Video," Hartung et al., Telecommunications Institute, University of Erlangen-Nuremberg, Systems for Video Communication, pp. 205-213, Oct. 1996 (9 pages).

"Large Scale Distributed Watermarking of Multicast Media through Encryption," Parviaien et al., Department of Computer Science, Lulea University of Technology, 2001 (10 pages).

"Applying Digital Watermarking Techniques to Online Multimedia Commerce," Jian Zhao, Proc. of the International Conference on Imaging Science, Systems, and Applications (CISSA97), Jun. 30-Jul. 3, 1997, Las Vegas, USA (7 pages).

International Bureau, "International Preliminary Report on Patentability," issued in connection with PCT application Serial No. PCT/US2008/060101, issued Oct. 12, 2010 (4 pages).

Stanescu et al., "Embedding Data in Video Stream using Steganography," SACI 2007—4th International Symposium on Applied Computation Intelligence and Informatics, 2007, 4 pages.

Ton Kalker, "Applications and Challenges for Audio Fingerprinting," 111th AES Convention, 2001, 15 pages.

Canadian Intellectual Property Office, "Office Action," issued in connection with Canadian patent application No. 2,691,016, on Dec. 30, 2013 (2 pages).

* cited by examiner

METHODS AND APPARATUS TO GENERATE AND USE CONTENT-AWARE WATERMARKS

FIELD OF THE DISCLOSURE

The present disclosure relates generally to media encoding and, more particularly, to methods and apparatus to generate and use content-aware watermarks.

BACKGROUND

Media-centric companies are often interested in tracking the number of times that audience members are exposed to media compositions (e.g., television programs, motion pictures, internet videos, radio programs, etc.). To track such exposures, companies often generate audio and/or video signatures (i.e., a representation of some, preferably unique, portion of the media composition or the signal used to transport the media composition) of media compositions that can be used to determine when those media compositions are presented to audience members. Additionally, companies embed identification codes into media compositions to monitor presentations of those media compositions to audience members by comparing identification codes retrieved from media compositions presented to audience members with reference to identification codes stored in a reference database in association with information descriptive of the media compositions. These identification codes can also be referred to as watermarks.

Configurations of data collection systems to collect signatures, and/or watermarks from media compositions typically vary depending on the equipment used to receive, process, and display media signals in each monitored consumption site (e.g., a household). For example, media consumption sites that receive cable television signals, satellite television signals, and/or Internet signals typically include set top boxes (STB's) and/or computers that receive media signals from a cable, a satellite, and/or an Internet service provider. Media delivery systems configured in this manner may be monitored using hardware, firmware, and/or software that interfaces with the STB to extract information (e.g., codes) or generate signal information (e.g., signatures) therefrom.

DETAILED DESCRIPTION

Figure 1:
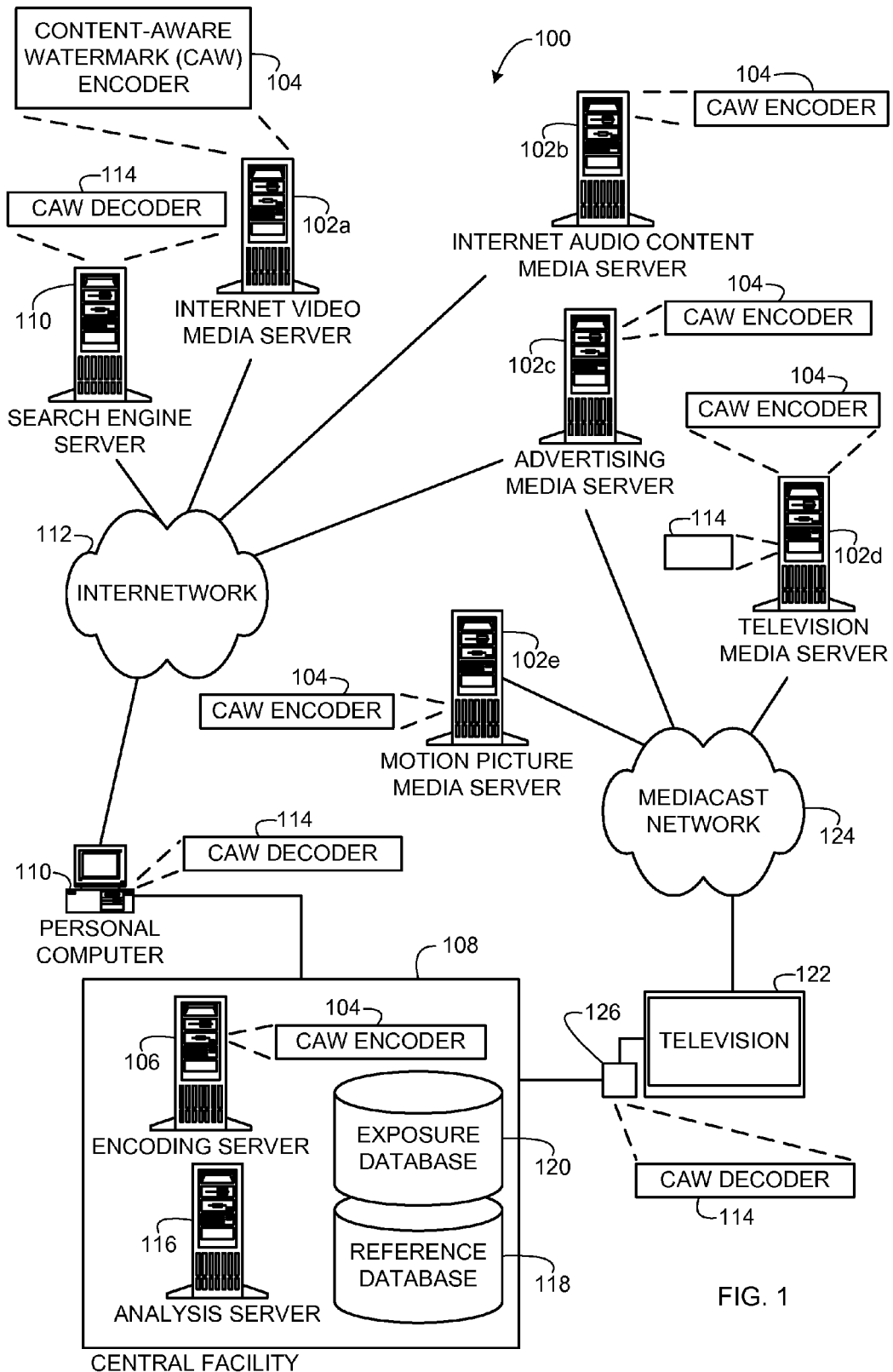
FIG. 1 illustrates an example media network system used to communicate media compositions or media presentations (e.g., audio files, media files, audio streams, video streams, etc.) to audience members.

Although the following discloses example methods, apparatus, and systems including, among other components, software executed on hardware, it should be noted that such methods, apparatus, and systems are merely illustrative and should not be considered as limiting. For example, it is contemplated that any or all of these hardware and software components could be embodied exclusively in hardware, exclusively in software, or in any combination of hardware and software. Accordingly, while the following describes example methods, apparatus, and systems, the examples provided are not the only way to implement such methods, apparatus, and systems.

The example methods and apparatus described herein can be used to generate content-aware watermarks. A watermark used in audio/video content is a piece of information (e.g., a code) that is embedded in the audio/video content. In some instances, a watermark may be used to establish ownership of audio/video media compositions by designing the watermark to be indicative of a particular entity or embedding information into the watermark to identify the entity. Additionally or alternatively, a watermark can include an identification code that can be used to correlate the watermark with an identity of the audio/video media compositions by comparing the code in the watermark to codes stored in a reference database in association with respective audio/video identifiers (e.g., titles, program names, etc.).

Unlike traditional watermarks that do not include information that alone is indicative of the content of the audio and/or video media compositions in which the watermarks are embedded, the proposed example methods and apparatus can be used to generate content-aware watermarks that include descriptive information pertaining to the audio/video content of their respective media compositions. In some instances, the content-aware watermarks can also be generated to include content-descriptive information corresponding to the locations in the audio/video composition at which the content-aware watermarks are embedded. For example, a content-aware watermark embedded in a scene of a video may include information indicative of a product or service (e.g., a soft drink, a financial service, a retail establishment chain, etc.) appearing (e.g., advertised) in that scene.

To generate the content-aware watermarks, the example methods and apparatus can be configured to receive audio/video content, decode closed captioning information in the audio/video content, and encode select words or phrases of the closed captioning information into the watermark. Closed caption text represents words and phrases that are spoken or otherwise presented on an audio track of media to convey messages, ideas, etc. to audience members. Selected words or phrases can be used as keywords representative of the audio/video content and/or scenes presented or mentioned in the media composition. In some example implementations, a keyword can be indicative of media content that is presented at a point in a media composition where a content-aware watermark is embedded in the media composition. In example implementations in which information descriptive about particular scenes or points in a media presentation are not desired, words or phrases can be selected from the beginning (or any other portion) of a media composition and encoded for audio and/or video watermark insertion in one or more locations of the media composition. In example implementations in which closed captioning information is not available, the proposed example methods and apparatus can be configured to use a speech-to-text converter to convert audio-track speech to text that can then be used to encode select words or phrases of audio/video content into a watermark.

In addition to or instead of using closed captioning information or speech-to-text conversion, the proposed example methods and apparatus may be configured to detect metadata (e.g., title, program name, international standard audiovisual number (ISAN), or any other identifier information), detect scene changes, detect blank frames or MPEG splice points, and/or detect logos and generate watermarks based on any one or more of the detected information. In the illustrated examples described herein, metadata refers to supplementary information describing specific instances of content in a media composition such as, for example, a creation date and time, a content ID of the media composition, creator information, blank frame information, decode information associated with watermarks, keyframe information, scene change information, and/or audio event information. For example, metadata may include temporal and/or spatial information defining events such as blank frames, scene changes, or audio events in the media composition. In some examples, the temporal information includes timestamps associated with specific times in the media composition at which events occur. Often, the timestamps include a start time and an end time that define the start and stop boundaries associated with an occurrence of an event. The spatial information includes location descriptions such as (x, y) locations on, for example, a video monitor on which an event appears. For example, if an event includes a blank frame, the (x, y) locations will define an entire video presentation screen. For data storage efficiency, the example methods and apparatus can be configured to generate coded versions of the detected information to, for example, compress the information.

Keywords (e.g., the selected words or phrases) embedded in the content-aware watermarks can be used to detect when people or audience members are exposed to or consume particular media content. For example, a media meter installed in an audience member home configured to monitor advertisement exposure can extract keywords from watermarks associated with television and/or radio advertisements to determine the product advertisements or brand advertisements to which the household members were exposed. For example, the brand name of a soft drink may be a keyword embedded in the watermark that can be used to determine that a household member was exposed to an advertisement for that soft drink. In some example media measurement applications, the generated watermarks can be extracted at an audience member household from audio/video presented to an audience member of the household. The extracted watermarks can then be forwarded to a central facility via, for example, a network connection, and the central facility can decode the words or phrases encoded in each watermark for subsequent analysis. Example analyses may include identifying brand name and/or product name keywords to determine advertisement exposures to particular brands and/or products. Other example analyses can also include comparing the words or phrases with words or phrases stored in a reference library of words or phrases stored in association with audio/video identifiers (e.g., movie titles, show titles, television programming names, etc.).

In addition, the keywords embedded in the content-aware watermarks can be used to enable searching for particular audio/video content stored in a database or throughout a network (e.g., an intranet, the Internet, etc.). For example, if a person is interested in finding video presentations mentioning a particular sports drink, the person can search the database or the network using the name of that sports drink. In some example implementations, internet search engine service providers or internet media providers could index the keywords in the content-aware watermarks to enable search engine users to find audio/video media of interest anywhere on the Internet or in particular data stores corresponding to the internet search engine service providers or internet media providers.

Turning to FIG. 1, an example media network system 100 used to communicate media compositions or media presentations (e.g., audio files, media files, audio streams, and/or video streams) to audience members includes a plurality of media servers 102*a-e* to store video/audio media for retrieval by audience members and/or for broadcasting to audience members. In the illustrated example, each of the servers 102*a-e* includes a respective content-aware watermark (CAW) encoder 104 to generate content-aware watermarks based on media content stored therein and embed the content-aware watermarks in respective media content. The content-aware watermark encoders 104 are described in detail below in connection with FIG. 2. Although in the illustrated example of FIG. 1 each of the media servers 102*a-e* is provided with its own content-aware watermark encoder 104, in other example implementations, the content-aware watermark encoders 104 may not be installed in the media servers 102*a-e* and may instead be installed at central media encoding servers such as, for example, an encoding server 106 at a central facility 108. In this manner, media contents to be encoded with content-aware watermarks may be communicated to the central facility 108 and the encoding server 106 can encode the media contents with respective content-aware watermarks and communicate the encoded media contents to their respective media servers. In other example implementations, some of the media servers 102*a-e* may be provided with the content-aware watermark encoders 104 while others may use the encoding server 106 at the central facility for content-aware watermarking encoding services.

In the illustrated example, a personal computer 110 may be coupled via an internetwork 112 (e.g., the Internet) to the internet video media server 102a, the internet audio content media server 102b, and/or the advertising media server 102c. The personal computer 110 may be used to decode and present media content received from any of those servers 102a-c. The personal computer 110 includes a content-aware watermark decoder 114 to extract content-aware watermarks from presented media content and to decode embedded keywords from the content-aware watermarks. In the illustrated example, the personal computer 110 communicates the extracted keywords to the central facility 108 for subsequent analysis. For example, an analysis server 116 in the central facility 108 can use the keywords to determine the number of times that users of the personal computer 110 were exposed to particular media content or to advertisements for particular products or brands. That is, if a keyword is the name of a financial service, the analysis server 116 can determine the number of times that users of the personal computer 110 were exposed to the name for that financial service (whether in an advertisement or elsewhere (e.g., news stories)) based on the number of times the personal computer 110 communicates the same financial service keyword to the central facility 108. In other example implementations, the analysis server 116 can compare received keywords to keywords stored in a reference database 118 in association with media identifiers, brand names, product names, etc. The reference database 118 may additionally or alternatively be used when generating content-aware watermarks by storing pre-determined or pre-identified terms of interest that are to be selected from media compositions for encoding into content-aware watermarks to be embedded in the media compositions. Additionally or alternatively, the reference database 118 may be configured to store code books having keywords stored in association with unique identifier codes corresponding to unique identifier codes encoded in content aware watermarks. When decoders extract the unique identifiers from content aware watermarks and communicate the unique identifiers to the central facility 108, the analysis server 116 can compare the received unique identifiers with unique identifiers in the reference database 118 to determine exposures to particular media content. The analysis server 116 can store exposure levels for keywords, advertisements and/or other audio/video media in an exposure database 120.

In some example implementations, the personal computer 110 may be configured to execute analysis processes to perform at least some or all of the analyses described above as being performed by the analysis server 116. In such example implementations, the personal computer 110 communicates the results of its analyses to the central facility 108 for storage in the exposure database 120 and/or for further processing by the analysis server 116. In yet other example implementations, the personal computer 110 may not extract keywords from content-aware watermarks but may instead communicate the content-aware watermarks to the central facility 108. The analysis server 116 may then extract the keywords from the content-aware watermarks for subsequent analysis.

In the illustrated example, a television 122 receives media content from the advertising media server 102c, the television media server 102d, and/or the motion picture media server 102e via a mediacast network 124. The mediacast network 124 may be an analog and/or digital broadcast network, a multicast network, and/or a unicast network. In the illustrated example, the television 122 is coupled to a media meter 126 having a content-aware watermark decoder 114 to extract content-aware watermarks from presented media content and to decode embedded keywords from the content-aware watermarks. The decoder 114 of the media meter 126 is substantially similar or identical to the decoder 114 of the personal computer 110. In addition, the media meter 126 operates in substantially the same way as the personal computer 110 with respect to extracting, decoding, and/or processing content-aware watermarks. That is, the media meter 126 can be configured to extract keywords from content-aware watermarks and communicate the keywords to the central facility 108. Alternatively or additionally, the media meter 126 can communicate the content-aware watermarks to the central facility 108 so that the analysis server 116 at the central facility can extract the keywords. In some example implementations, the media meter 126 may be configured to analyze the keywords for determining media exposure and may communicate the analysis results to the central facility 108 for storage in the exposure database 120 and/or for further processing by the analysis server 116.

In the illustrated example, a search engine server 110 may be configured to index media compositions stored in the media servers 102a-c based on keywords in the content-aware watermarks embedded in those media compositions. In this manner, users accessing the search engine service via personal computers (e.g., the personal computer 110) connected to the internetwork 112 can use text searches to search for media compositions based on the keywords in the content-aware watermarks. This enables providing more comprehensive searchability of media compositions (e.g., video files, audio files, etc.) based on their contents than do search processes that search media compositions based on file names, user-generated tags, or user-generated descriptive information about media files since such file names, user-generated tags, and user-generated descriptive information may not include keywords present in the content that might be of interest to a user searching for that content.

Figure 2:
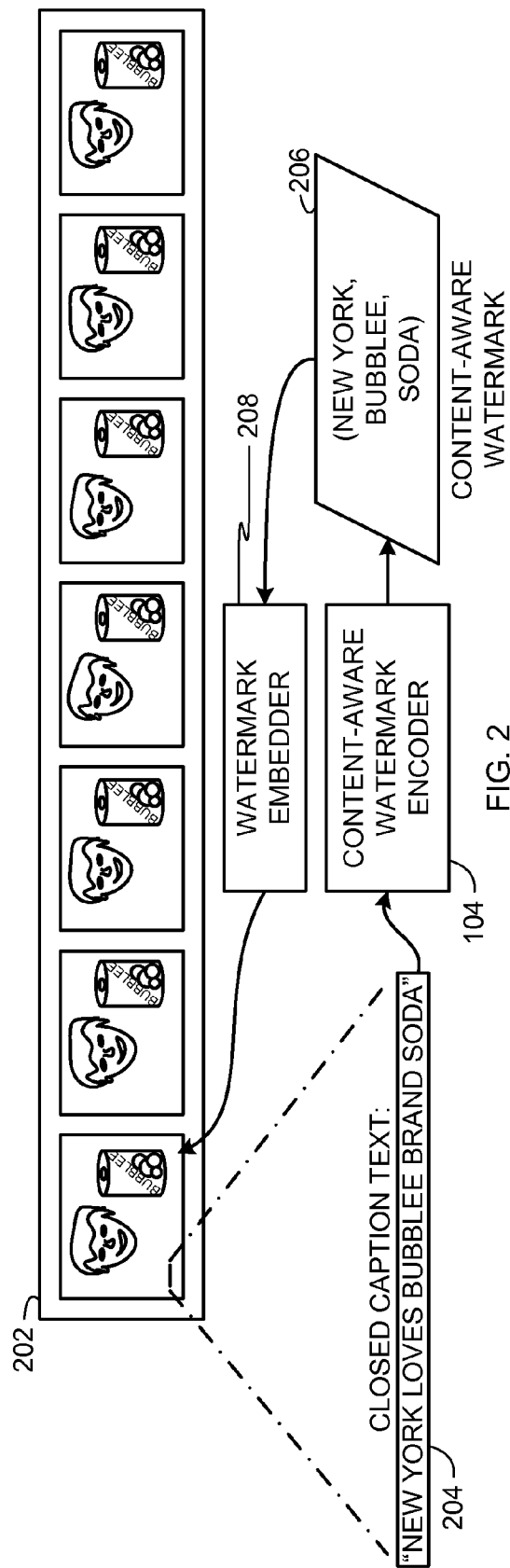
FIG. 2 depicts an example media excerpt having closed caption text used by a content-aware watermark encoder of FIG. 1 to generate a content-aware watermark.

FIG. 2 depicts an example media excerpt 202 having closed caption text 204 used by the content-aware watermark encoder 104 of FIG. 1 to generate a content-aware watermark 206. In the illustrated example, the content-aware watermark encoder 104 receives the closed caption text 204 of the media excerpt 202 that recites "New York loves Bubblee brand soda." To generate the content-aware watermark 206, the content-aware watermark encoder 104 selects keywords indicative of the media content presented in the media excerpt 202. In the illustrated example, the content-aware watermark encoder 104 selects the terms 'New York,' 'Bubblee,' and 'soda.' The term 'New York' indicates that the advertisement corresponding to the media excerpt 202 is directed to residents of New York City, areas surrounding New York City, and/or to others that like New York City or have an affiliation with New York City. The term 'Bubblee' identifies the name of the product being advertised. The term 'soda' identifies the type of product being advertised.

After the content-aware watermark encoder 104 generates the content-aware watermark 206, a watermark embedder 208 can embed the watermark 206 in one or more frames of the media excerpt 202 using any suitable watermark embedding technique. The watermark embedder 208 can be configured to embed the watermark 206 in a video portion of the media excerpt 202 and/or an audio portion of the media excerpt 202. In some example implementations, embedding a watermark in a video domain enables using relatively larger watermarks because of the relatively larger bandwidth available for video than is typically available for audio.

Figure 8:
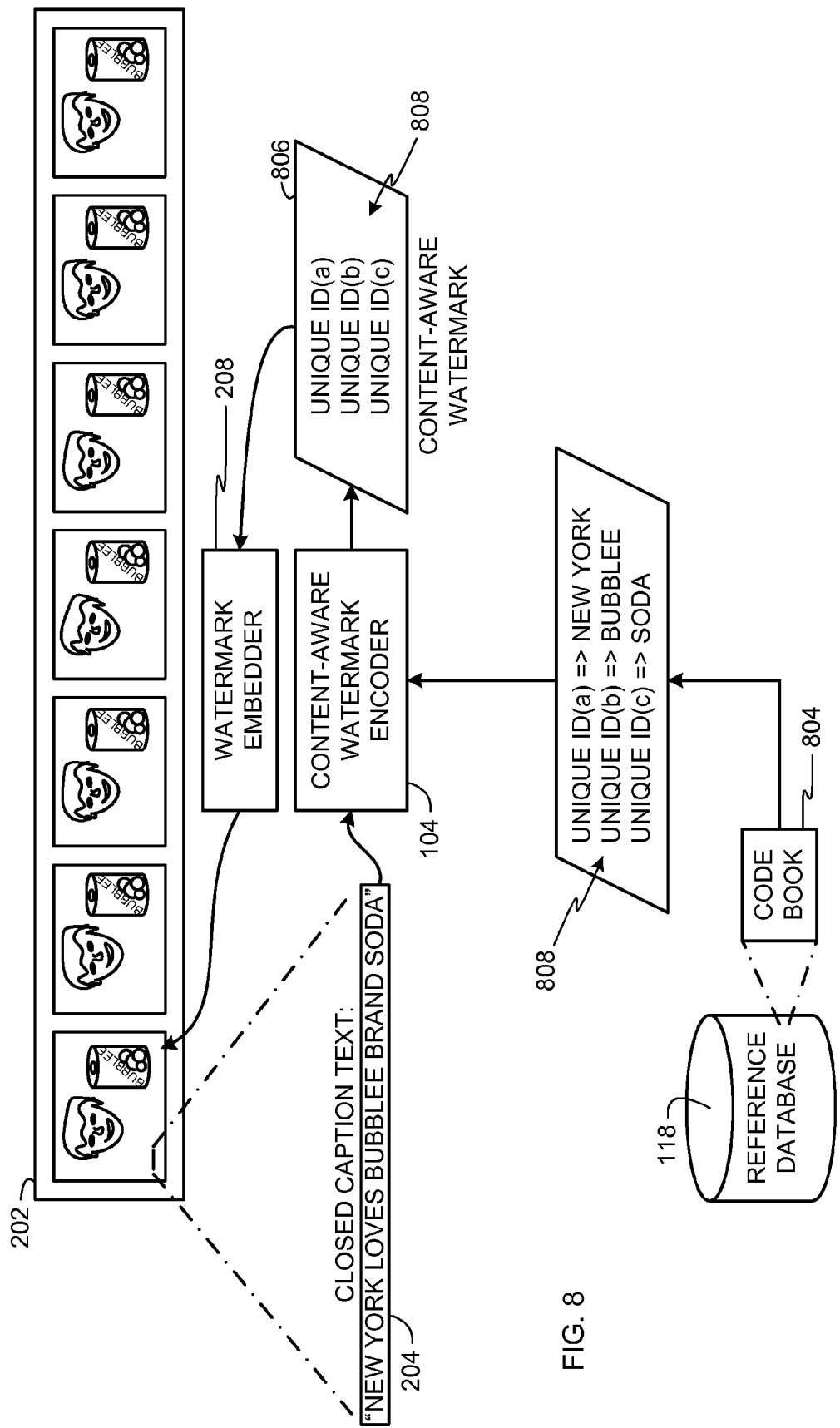
FIG. 8 depicts the example content-aware watermark encoder of FIGS. 1-4 configured to encode unique identifiers in content-aware watermarks based on a code book storing the unique identifiers in association with keywords.

Turning to FIG. 8, in alternative example implementations, the content-aware watermark encoder 104 may additionally or alternatively be configured to use a code book 804 to generate a content-aware watermark 806 having unique identifiers 808 associated with selected keywords from media content. In the illustrated example, the code book 804 is stored in the reference database 118 and stores the unique identifiers 808 in association with respective ones of the keyword terms 'New York,' 'Bubblee,' and 'soda.' In other example implementations, the code book 804 can be stored in data structures other than the reference database 118. In the illustrated example of FIG. 8, the watermark encoder 104 is configured to retrieve the unique identifiers 808 from the code book 804 based on the keywords 'New York,' 'Bubblee,' and 'soda' and encode the unique identifiers 808 in the content-aware watermark 806. The watermark embedder 208 can then embed the watermark 806 in the media excerpt 202. Thus, in the illustrated example of FIG. 8, instead of using content-aware watermarks to embed keywords in media compositions, the content-aware watermarks are used to embed unique identifiers that can subsequently be used to identify associated keywords (e.g., the keywords 'New York,' 'Bubblee,' and 'soda') by looking up the unique identifiers (e.g., the unique identifiers 808) in the code book 804.

Figure 3:
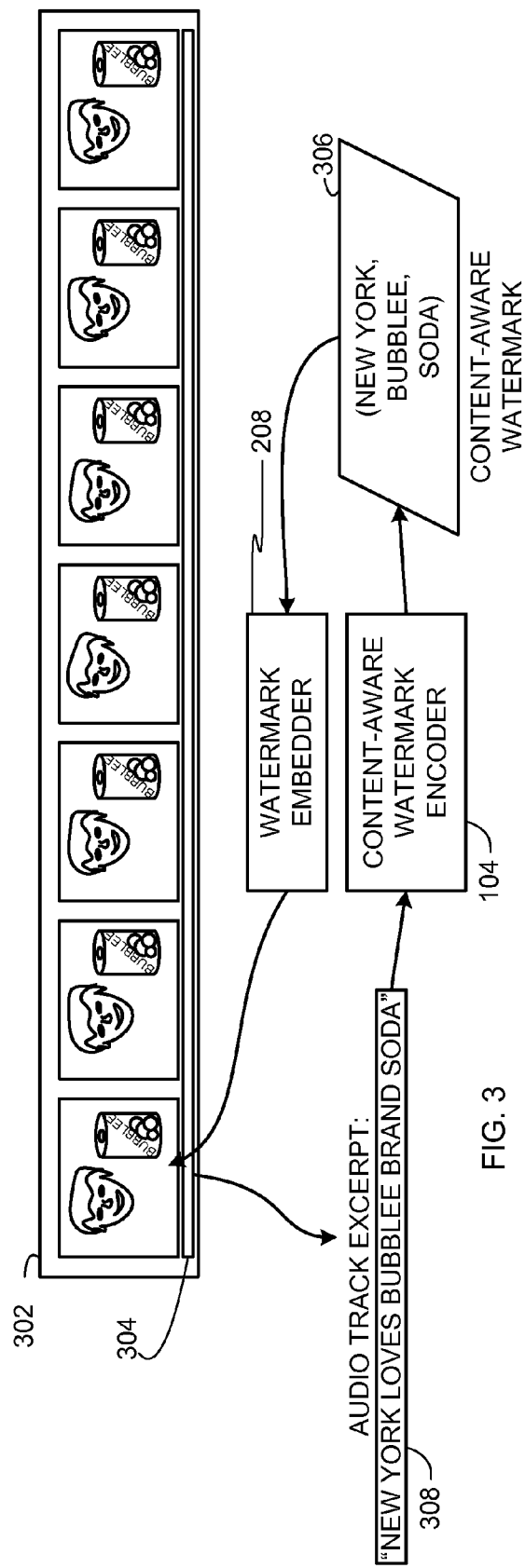
FIG. 3 depicts an example media excerpt having an audio track used by the example content-aware watermark encoder of FIGS. 1 and 2 to generate a content-aware watermark.

Turning now to FIG. 3, an example media excerpt 302 has an audio track 304 used by the content-aware watermark encoder 104 of FIGS. 1 and 2 to generate a content-aware watermark 306. In the illustrated example, the example media excerpt 302 does not have closed caption text and the content-aware watermark encoder 104 uses a speech-to-text converter to select keywords from the audio track 304 to generate the content-aware watermark 306. As shown, the content-aware watermark encoder 104 receives an audio track excerpt 308 of the media excerpt 302 that recites "New York loves Bubblee brand soda." To generate the content-aware watermark 306, the content-aware watermark encoder 104 performs a speech-to-text translation on the received audio track excerpt 308, selects the keywords 'New York,' 'Bubblee,' and 'soda' indicative of the media content presented in the media excerpt 202, and generates the content-aware watermark 306 by encoding the selected keywords in the content-aware watermark 306. Alternatively, the content-aware watermark encoder 104 may be configured as discussed above in connection with FIG. 8 to encode unique identifiers (e.g., the unique identifiers 808) corresponding to the selected keywords in the content-aware watermark 306. In any case, after the content-aware watermark 306 is generated, the watermark embedder 208 embeds the watermark 306 in one or more frames of the media excerpt 302 using any suitable watermark embedding technique.

Although the example implementations of FIGS. 2, 8, and 3 depict the content-aware watermark encoder 104 as being configured to generate content-aware watermarks based on closed caption text and/or audio tracks, the content-aware watermark encoder 104 may additionally or alternatively be configured to generate content-aware watermarks based on other features or characteristics of media compositions. For example, the content-aware watermark encoder 104 may additionally or alternatively be configured to generate content-aware watermarks based on metadata (e.g., title, program name, international standard audiovisual number (ISAN), or any other identifier information), scene changes, blank frames or MPEG splice points, detected logos, etc. Example methods and apparatus to detect logos in content are disclosed in U.S. Provisional Application No. 60/986,723 entitled "Methods and Apparatus to Measure Brand Exposure in Media Streams," and filed on Nov. 9, 2007, which is hereby incorporated by reference herein in its entirety. Example methods and apparatus to detect blank frames are disclosed in U.S. application Ser. No. 11/534,790 entitled "Methods and Apparatus to Detect a Blank Frame in a Digital Video Broadcast Signal," filed on Sep. 25, 2006, which is hereby incorporated by reference herein in its entirety.

Figure 4:
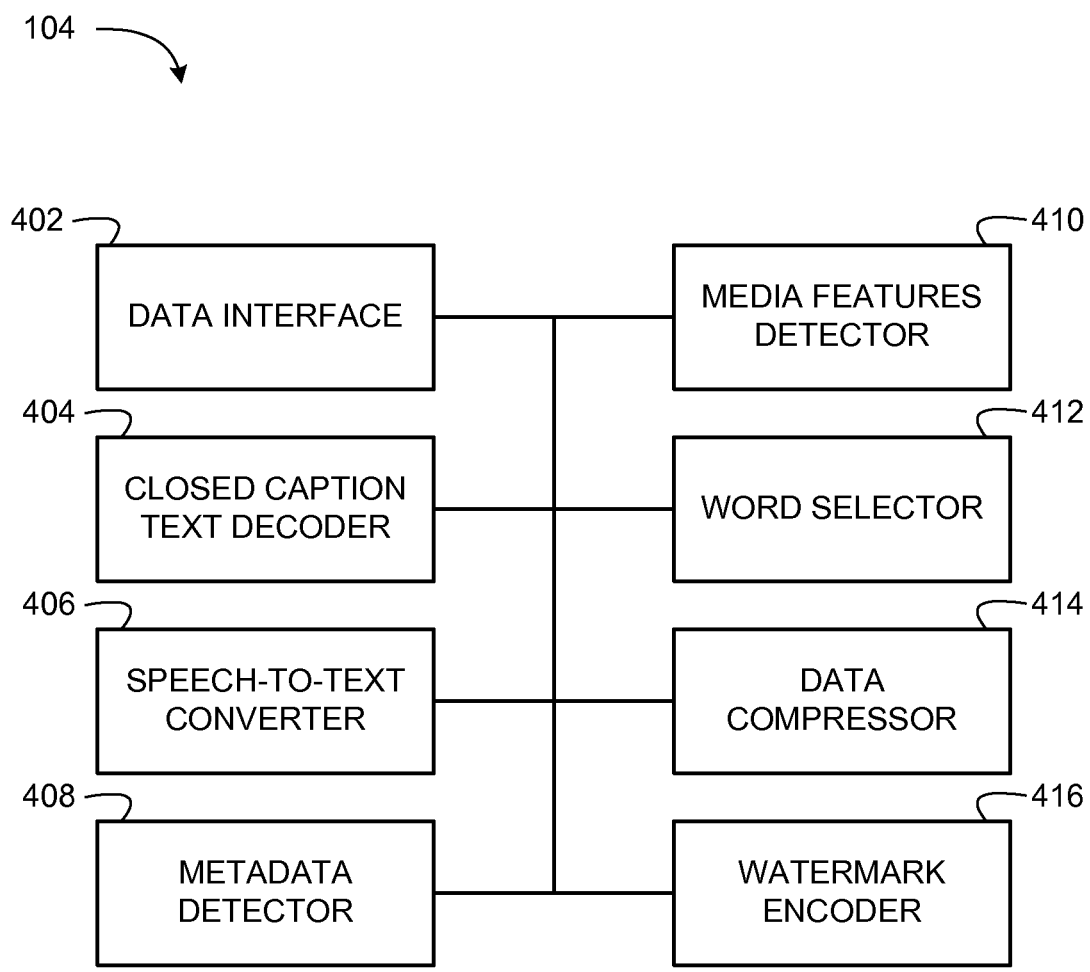
FIG. 4 is a block diagram of an example apparatus that may be used to implement the example content-aware watermark encoder of FIGS. 1-3.

FIG. 4 is a block diagram of an example apparatus that may be used to implement the example content-aware watermark encoder 104 of FIGS. 1-3, and 8. In the illustrated example, the example content-aware watermark encoder 104 includes a data interface 402, a closed caption text decoder 404, a speech-to-text converter 406, a metadata detector 408, a media features detector 410, a word selector 412, a data compressor 414, and a watermark encoder 416. The example content-aware watermark encoder 104 may be implemented using any desired combination of hardware, firmware, and/or software. For example, one or more integrated circuits, discrete semiconductor components, and/or passive electronic components may be used. Thus, for example, any of the data interface 402, the closed caption text decoder 404, the speech-to-text converter 406, the metadata detector 408, the media features detector 410, the word selector 412, the data compressor 414, and/or the watermark encoder 416, or parts thereof, could be implemented using one or more circuit(s), programmable processsor(s), application specific integrated circuit(s) (ASIC(s)), programmable logic device(s) (PLD(s)), field programmable logic device(s) (FPLD(s)), etc.

Figure 13:
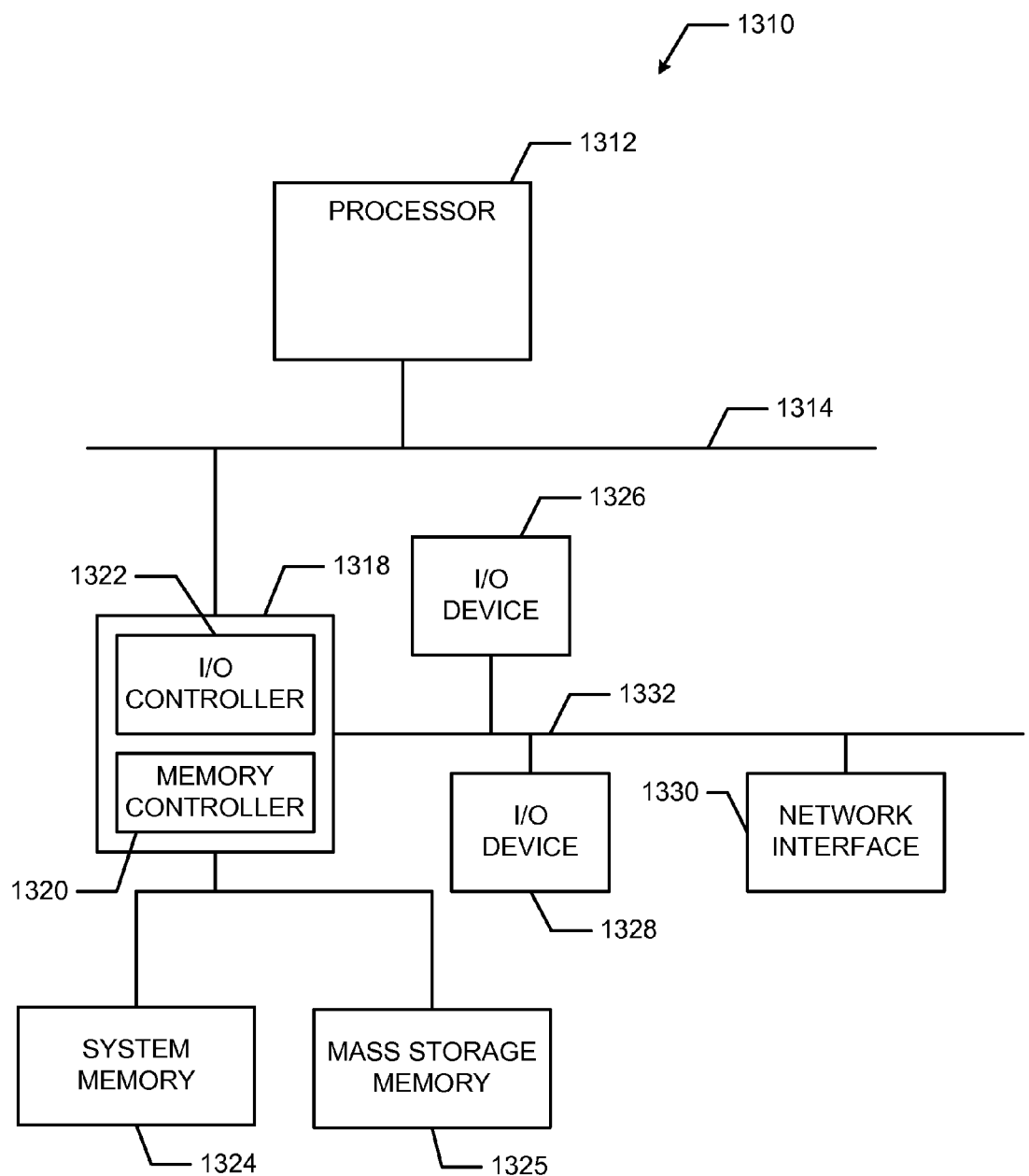
FIG. 13 is a block diagram of an example processor system that may be used to implement some or all of the example methods and apparatus described herein.

Some or all of the data interface 402, the closed caption text decoder 404, the speech-to-text converter 406, the metadata detector 408, the media features detector 410, the word selector 412, the data compressor 414, and/or the watermark encoder 416, or parts thereof, may be implemented using instructions, code, and/or other software and/or firmware, etc. stored on a machine accessible medium and executable by, for example, a processor system (e.g., the example processor system 1310 of FIG. 13). When any of the appended claims are read to cover a purely software implementation, at least one of the data interface 402, the closed caption text decoder 404, the speech-to-text converter 406, the metadata detector 408, the media features detector 410, the word selector 412, the data compressor 414, and/or the watermark encoder 416 is hereby expressly defined to include a tangible medium such as a memory, DVD, CD, etc.

To transmit and receive data, the example content-aware watermark encoder 104 is provided with the data interface 402. In the illustrated example, the data interface 402 can be used to receive media composition data (e.g., audio data, video data, etc.), closed caption data, metadata, etc. from media sources (e.g., computer interfaces, cable boxes, televisions, media players, etc.), and communicate content-aware watermarks to, for example, the watermark embedder 208 (FIGS. 2, 8, and 3). Although not shown in FIG. 4, in some example implementations, the watermark embedder 208 may be implemented as part of the example content-aware watermark encoder 104.

To extract or decode closed caption text from media data received via the data interface 402, the example content-aware watermark encoder 104 is provided with the closed caption text decoder 404. In some example implementations, the closed caption text decoder 404 may be omitted from the example content-aware watermark encoder 104 and the content-aware watermark encoder 104 may be configured to receive decoded closed caption text from a closed caption text decoder of a media source coupled to the data interface 402.

To convert speech from media audio tracks to text, the example content-aware watermark encoder 104 is provided with the speech-to-text converter 406. In the illustrated example, the speech-to-text converter 406 is used to recognize words in media that does not have closed caption text associated therewith or in situations where closed caption text cannot be obtained (e.g., failure or omission of the closed caption text decoder 404). In example implementations in which speech-to-text conversion capabilities are not desired, the speech-to-text converter 406 can be omitted from the example content-aware watermark encoder 104.

To detect metadata in media, the example content-aware watermark encoder 104 is provided with the metadata detector 408. In the illustrated example, the example content-aware watermark encoder 104 includes the media features detector 410 configured to detect particular characteristics or features (e.g., scene changes, blank frames, MPEG splice points, logos, etc.) in media content and generate metadata descriptive of those characteristics or features.

To select words or phrases to form keywords, the example content-aware watermark encoder 104 is provided with the word selector 412. In the illustrated example, the word selector 412 is configured to select words or phrases in metadata, closed caption text, and/or audio tracks indicative or descriptive of respective media content. Additionally or alternatively, the word selector 412 may be configured to select words or phrases that might be of interest to a user searching for media content. To select the words or phrases, the word selector 412 may be configured to use weighted numeric factors or values assigned to pre-determined or pre-identified terms stored in the reference database 118 of FIG. 1. In this manner, if multiple terms in the reference database 118 are found in a portion of a media composition, the keywords used in connection with a content-aware watermark for that media composition can be limited to the terms with the highest weights.

To compress data (e.g., keywords, unique identifiers, metadata, etc.) for insertion in content-aware watermarks, the example content-aware watermark encoder 104 is provided with the data compressor 414. In some example implementations, the amount of data space in media frames, packets, etc. may be limited and, thus, compressing keywords and/or other data used to form a content-aware watermark may be used to ensure that the watermark may be successfully embedded in the media. In some example implementations, the data compressor 414 may be configured to compress data using an encoding technique involving truncating a keyword to generate a partial keyword of a particular character length and encoding each character of the partial keyword using a predetermined number of bits (e.g., five bits) to form a character-bit compressed partial keyword. For example, the compressor 414 may be configured to truncate keywords to their first five characters and encode each of the first five characters using five bits per character for a total of twenty bits per keyword. For the English language, each alphabetic character in the English alphabet that is typically represented in binary using ASCII binary code can be assigned a relatively shorter unique bit combination such that when a particular alphabetic character appears in a keyword in ASCII binary code, the data compressor 414 can represent that alphabetic character using its associated, relatively shorter unique bit combination (e.g., 'A'=00001(binary), 'B'=00010(binary), 'C'=00011(binary), etc.). If a particular media composition allows 50 bits every two seconds for watermarking purposes, ten characters can be transmitted via one or more content-aware watermarks every two seconds (i.e., (25 bits/second)/(5 bits/character)=5 characters per second or 10 characters every two seconds).

In other example implementations, the data compressor 414 may be configured to encode keywords by discarding predetermined alphabetic characters. For example, for each keyword selected by the word selector 412, the data compressor can omit certain vowels or all vowels from the keyword to form a partial keyword before embedding the keyword in a content-aware watermark. Alternatively, the data compressor 414 can omit certain consonants or a mix of vowels and consonants from a keyword to generate a partial keyword.

Additionally or alternatively, the data compressor 414 can be configured to perform Huffman or Arithmetic coding processes to encode keywords selected by the word selector 412 and/or partial keywords generated by the data compressor 414 as described above. In such an implementation, the data compressor 414 can be configured to assign fewer bits to encode characters that are more probable of being present in keywords (i.e., characters that have a higher frequency of occurrence among different keywords) and relatively more bits to encode characters that are less probable of being present in keywords.

To generate and encode content-aware watermarks with the data (e.g., keywords, unique identifiers, metadata, etc.) selected by the metadata detector 408, the media features detector 410, and/or the word selector 412, the example content-aware watermark encoder 104 is provided with the watermark encoder 416. In the illustrated example, the watermark encoder 416 can encode or embed compressed and/or non-compressed keyword(s) into watermarks to generate content-aware watermarks.

Additionally or alternatively, the watermark encoder 416 may be configured to encode or embed unique identifiers (e.g., the unique identifiers 808 of FIG. 8 corresponding to the keywords 'New York,' 'Bubblee,' and 'soda') in content-aware watermarks. For example, the data interface 402 can access the code book 804 (FIG. 8) to retrieve unique identifiers corresponding to keywords selected by the word selector 412, and the watermark encoder 416 can embed or encode compressed or non-compressed forms of the unique identifiers in content-aware watermarks.

Figure 6:
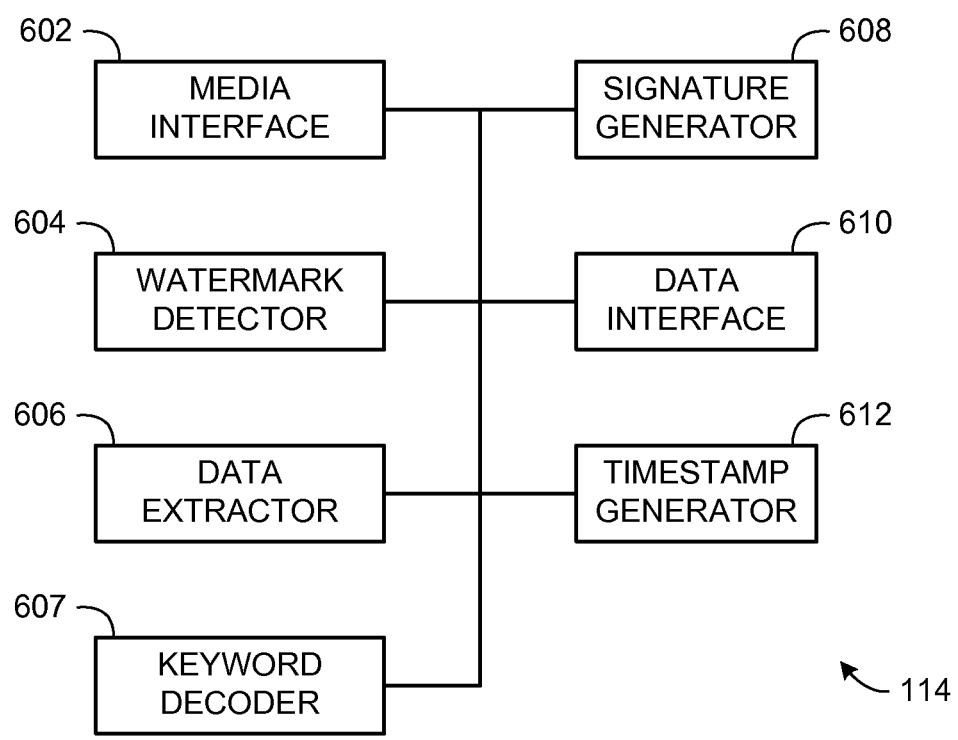
FIG. 6 is a block diagram of an example apparatus that may be used to implement the example content-aware watermark decoder of FIG. 1.

FIG. 6 is an example apparatus that may be used to implement the example content-aware watermark decoder 114 of FIG. 1. In the illustrated example, the example content-aware watermark decoder 114 includes a media interface 602, a watermark detector 604, a data extractor 606, a keyword decoder 607, a signature generator 608, a data interface 610, and a timestamp generator 612. The example content-aware watermark decoder 114 may be implemented using any desired combination of hardware, firmware, and/or software. For example, one or more integrated circuits, discrete semiconductor components, and/or passive electronic components may be used. Thus, for example, any of the media interface 602, the watermark detector 604, the data extractor 606, the keyword decoder 607, the signature generator 608, the data interface 610, and/or the timestamp generator 612, or parts thereof, could be implemented using one or more circuit(s), programmable processsor(s), application specific integrated circuit(s) (ASIC(s)), programmable logic device(s) (PLD(s)), field programmable logic device(s) (FPLD(s)), etc.

Some or all of the media interface 602, the watermark detector 604, the data extractor 606, the keyword decoder 607, the signature generator 608, the data interface 610, and/or the timestamp generator 612, or parts thereof, may be implemented using instructions, code, and/or other software and/or firmware, etc. stored on a machine accessible medium and executable by, for example, a processor system (e.g., the example processor system 1310 of FIG. 13). When any of the appended claims are read to cover a purely software implementation, at least one of the media interface 602, the watermark detector 604, the data extractor 606, the keyword decoder 607, the signature generator 608, the data interface 610, and/or the timestamp generator 612 is hereby expressly defined to include a tangible medium such as a memory, DVD, CD, etc.

To receive audio and/or video media, the example content-aware watermark decoder 114 is provided with the media interface 602. To detect watermarks (e.g., the content-aware watermark 206 of FIG. 2) in the media received via the media interface 602, the example content-aware watermark decoder 114 is provided with the watermark detector 604. The content-aware watermarks detected by the watermark detector 604 may be metadata-based watermarks (e.g., blank frame watermarks, scene change watermarks, etc.) and/or content-aware watermarks including keywords extracted from closed caption text.

To extract keyword(s) and/or unique identifier(s) from the detected content-aware watermarks, the example content-aware watermark decoder 114 is provided with the data extractor 606. For example, the data extractor 606 may extract the keywords 'New York,' 'Bubblee,' and/or 'soda' from the content-aware watermark 206 described above in connection with FIGS. 2 and 3. Additionally or alternatively, the data extractor 606 may extract the unique identifiers 808 from the content-aware watermark 806 described above in connection with FIG. 8.

In the illustrated example, the content-aware watermark decoder 114 is also provided with the keyword decoder 607 to decode whole or partial keywords detected in content-aware watermarks. As discussed above in connection with FIG. 4, in some example implementations, the data compressor 414 may be configured to compress keywords using encoding techniques involving truncating a keyword and/or omitting certain characters from a keyword to generate a partial keyword and encoding each character of the partial keyword (or a whole keyword if the whole keyword was not truncated or otherwise modified by omitting characters) using a predetermined number of bits (e.g., five bits) per character. When the encoded partial keyword is detected by the content-aware watermark decoder 114, the keyword decoder 607 analyzes the partial keyword using a spell checker process to decode the partial keyword by reconstructing or deriving a whole keyword from the partial keyword based on recommendations by the spell checker process. In the illustrated example, to execute the spell checker process, the keyword decoder 607 stores a dictionary database (not shown). In some example implementations, the dictionary database may include only keywords that the word selector 412 (FIG. 4) would select to form content-aware watermarks such as, for example, product brand names, proper names of geographical locations, names of persons (e.g., actor/character names), topical words (e.g., cars, food, hair-care products, etc.), etc. In other example implementations, the dictionary database may include relatively more words including those that the word selector 412 would not select such as, for example, keywords manually selected by a person or selected using another process not performed by the word selector 412. Additionally or alternatively the keyword decoder 607 can be configured to perform Huffman or Arithmetic decoding processes to decode keywords and/or partial keywords embedded in content-aware watermarks by the content-aware watermark encoder 104.

In the illustrated example, the content-aware watermark decoder 114 is also provided with a signature generator 608 to generate signatures of audio and/or video portions of the media received via the media interface 602. In the illustrated example, the signature generator 608 generates signatures of video or audio frames specified by metadata in metadata-based content-aware watermarks. For example, if a content-aware watermark indicates the presence of a blank frame at a certain location in a media composition, the signature generator 608 can generate one or more signatures of one or more audio or video frames following the blank frame. In some example implementations, the signatures can be compared to reference signatures stored in, for example, the reference database 118 of FIG. 1 in association with media composition identification information to identify the media compositions presented to audience members.

To store the keyword(s), unique identifier(s), and/or signature(s) in a memory and/or communicate the same to the central facility 108 (FIG. 1), the example content-aware watermark decoder 114 is provided with the data interface 610. In the illustrated example, the timestamp generator 612 is configured to generate timestamps indicating the date and/or time at which the keyword(s) or unique identifier(s) are recovered from a media composition by the content-aware watermark decoder 114 and/or signature(s) are generated. The timestamps may be representative of a time of day to indicate when an audience member was exposed to media content represented by the keyword(s) or unique identifier(s) or the timestamp may be representative of a track time or elapsed media presentation time of the media composition to indicate the temporal location in the media composition from where the watermark(s) containing the keyword(s) or unique identifier(s) were extracted or signature(s) were generated.

Figure 5A:
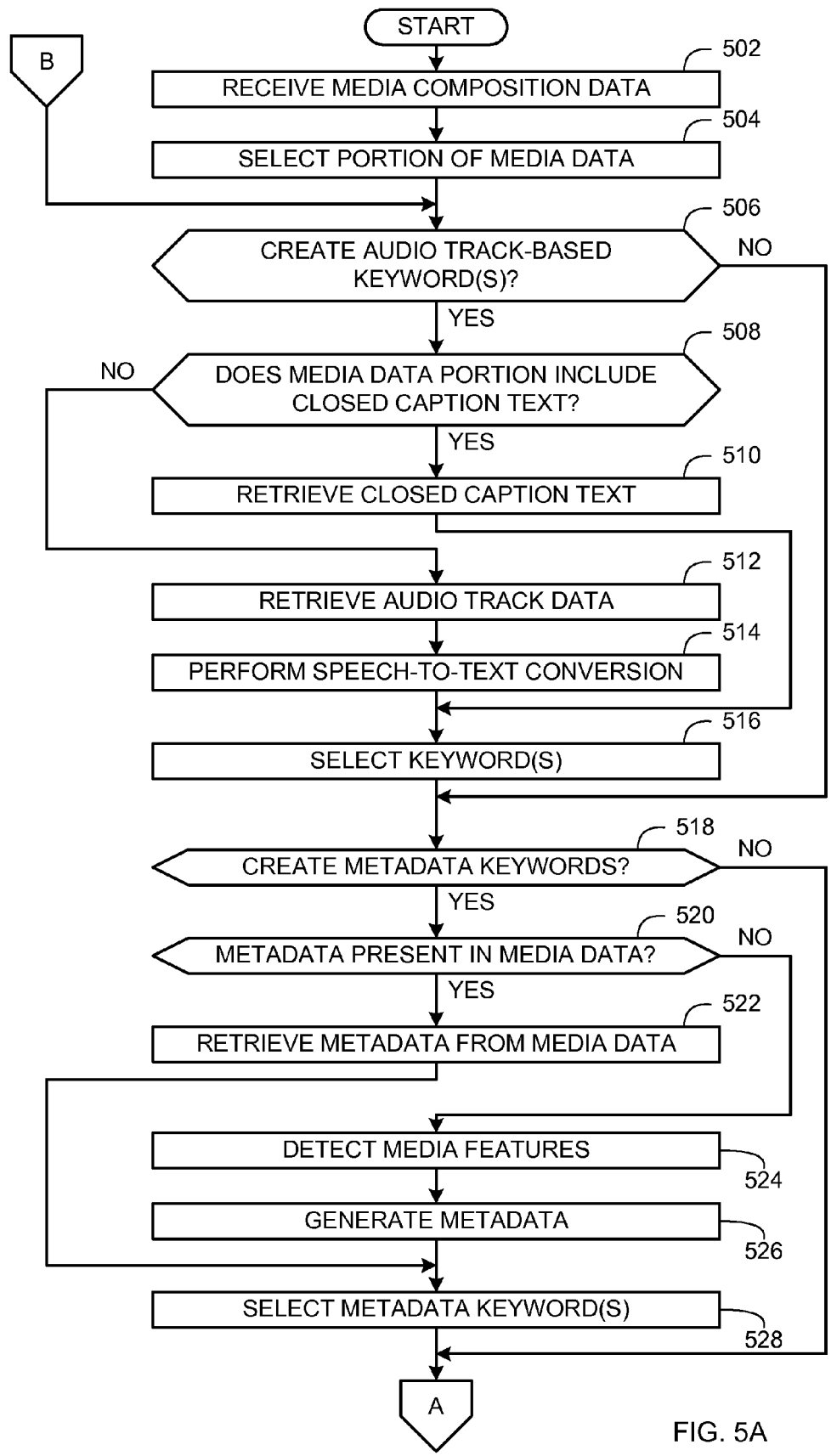
FIGS. 5A and 5B depict a flow diagram representative of example machine readable instructions that may be executed to implement the example content-aware watermark encoder of FIGS. 1-4 and 8 to generate content-aware watermarks and embed the content-aware watermarks into media compositions.
Figure 5B:
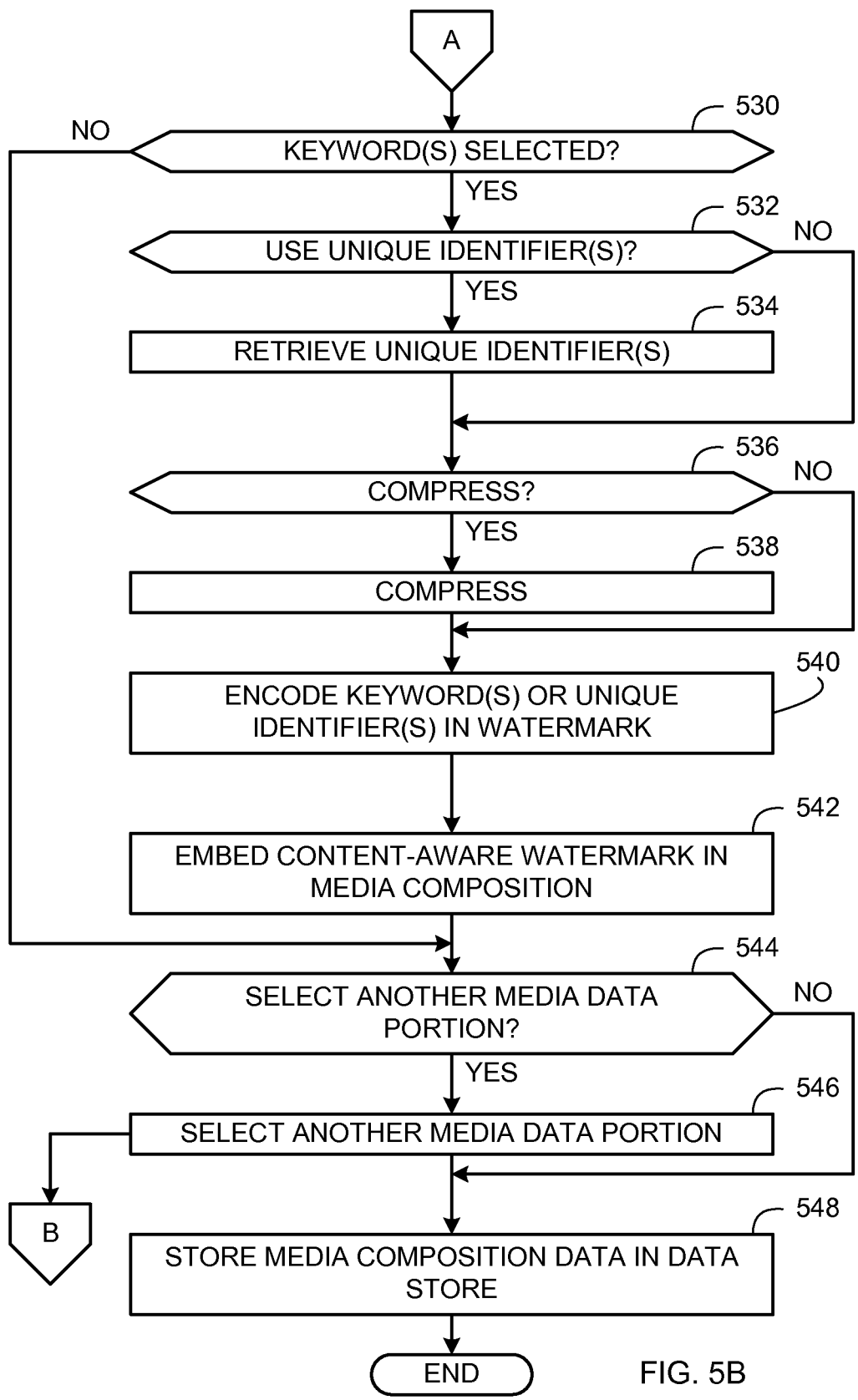
Figure 7:
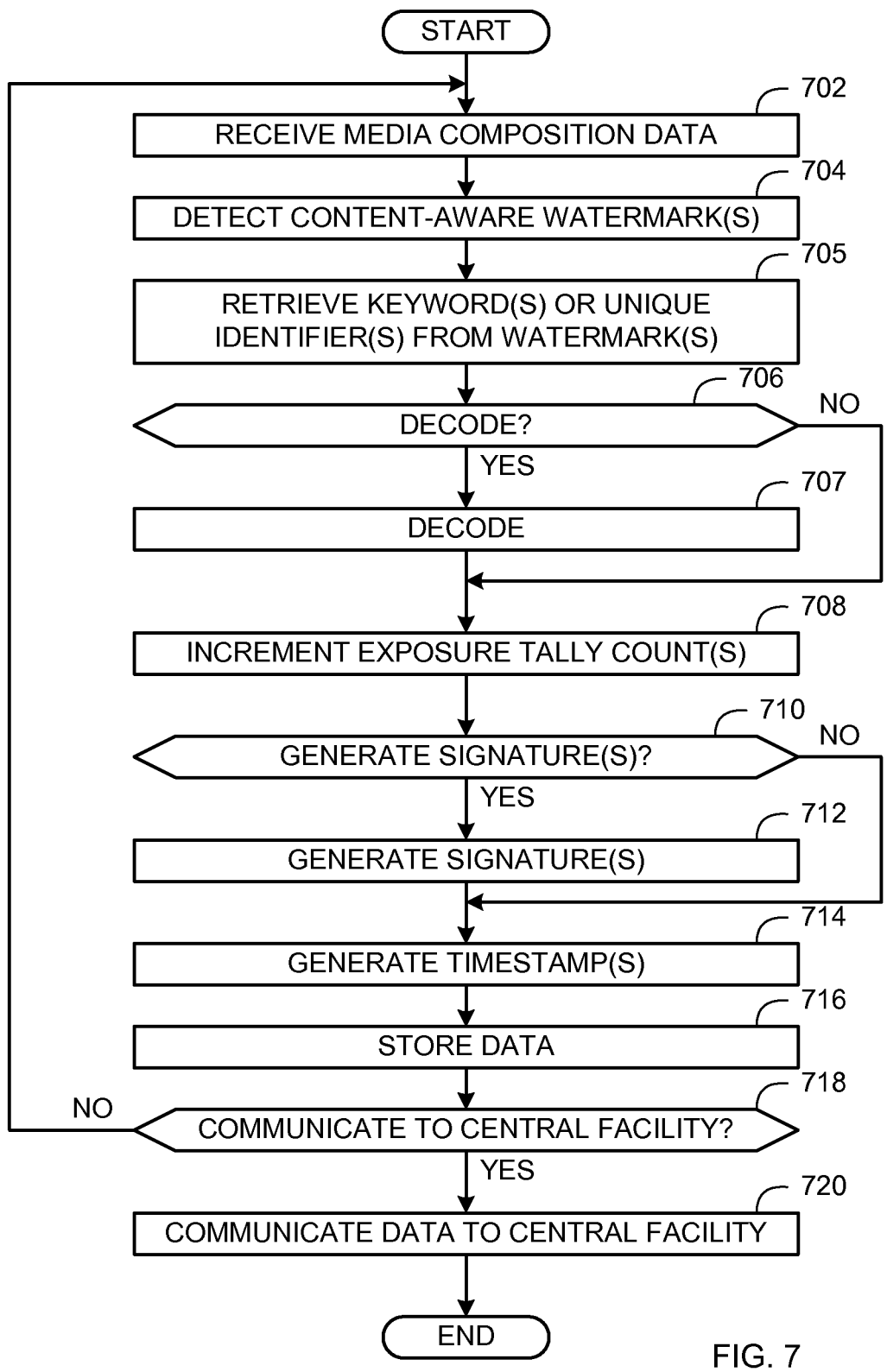
FIG. 7 is a flow diagram representative of example machine readable instructions that may be executed to implement the example content-aware watermark decoder of FIGS. 1 and 6 to generate media exposure counts to determine the number of times one or more audience members have been exposed to particular media compositions.
Figure 9:
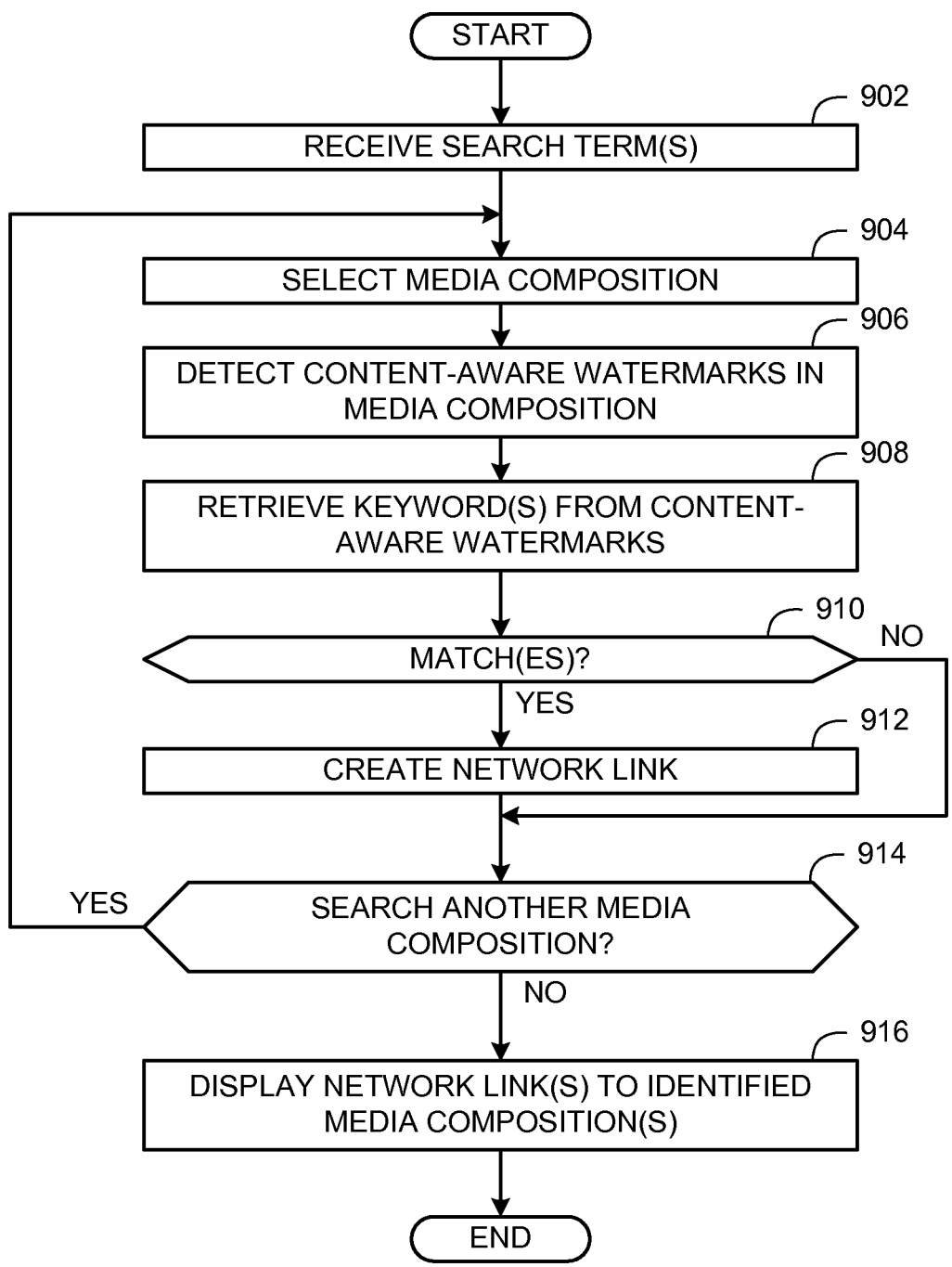
FIG. 9 is a flow diagram representative of example machine readable instructions that may be executed to implement the search engine server of FIG. 1 to find media compositions having watermark-embedded keywords matching provided search terms.
Figure 10:
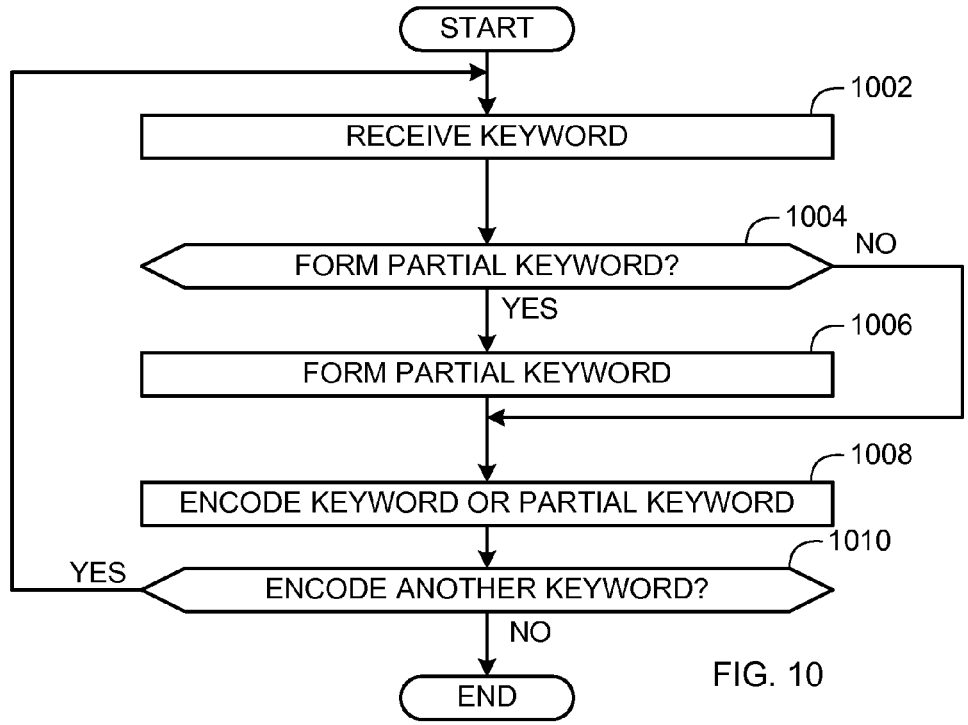
FIG. 10 is a flow diagram representative of example machine readable instructions that may be executed to implement a data compressor of the example content-aware watermark encoder of FIGS. 1 and 4 to encode whole keywords or partial keywords.
Figure 11:
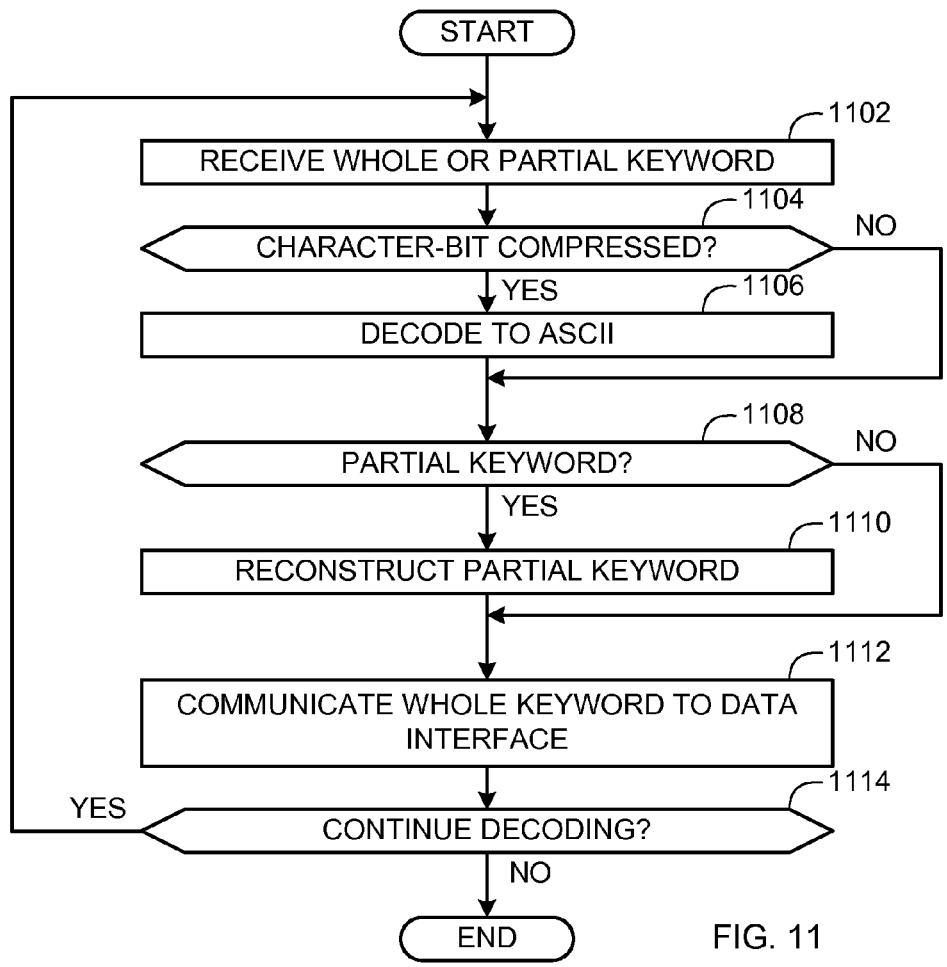
FIG. 11 is a flow diagram representative of example machine readable instructions that may be executed to implement a keyword decoder of the example content-aware watermark decoder of FIGS. 1 and 6 to decode whole keywords or partial keywords detected in content-aware watermarks.
Figure 12:
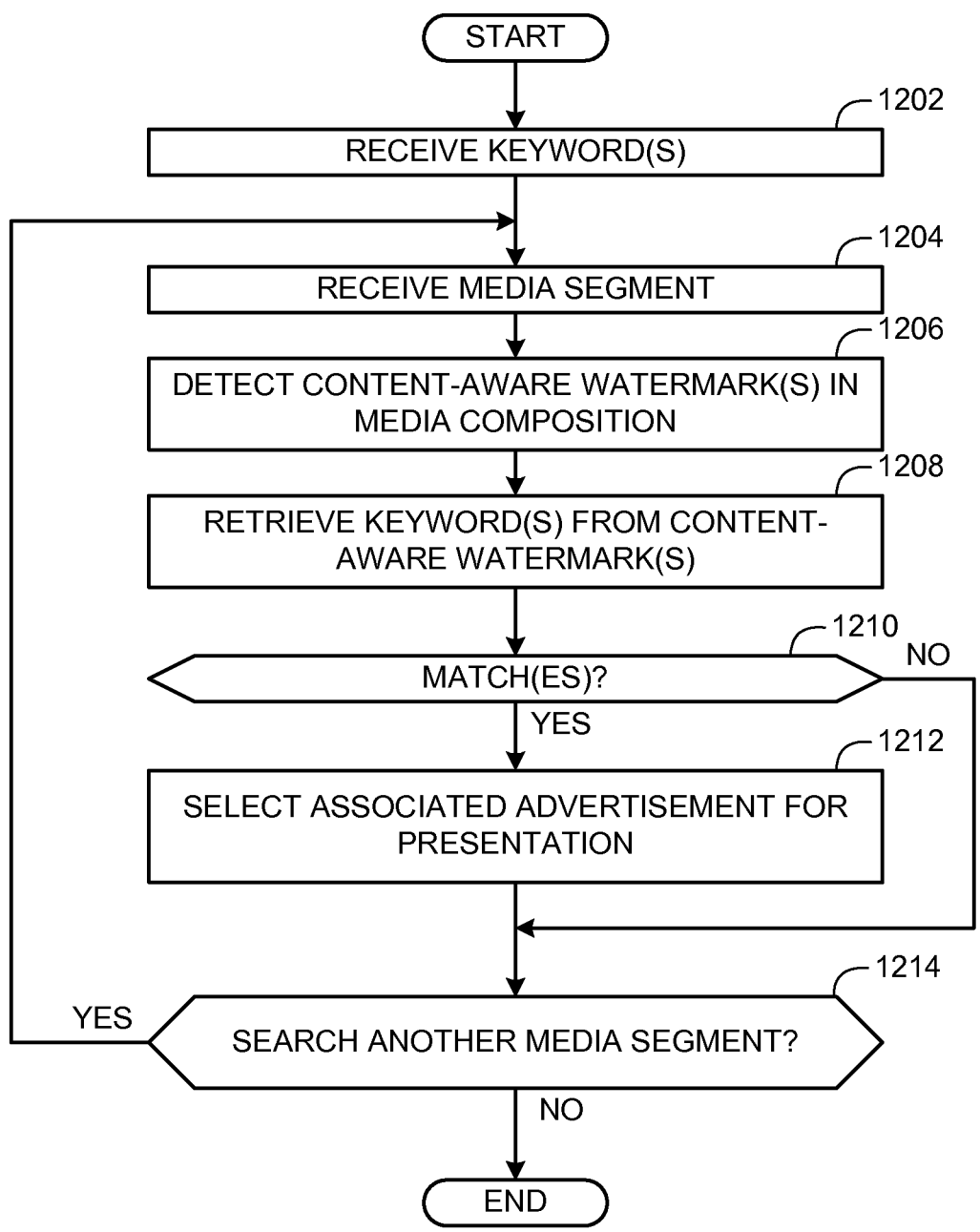
FIG. 12 is a flow diagram representative of example machine readable instructions that may be executed to implement a targeted advertising process using the content-aware watermarks described herein.

Flow diagrams depicted in FIGS. 5A, 5B, 7, and 9-12 are representative of machine readable instructions that can be executed to implement the example content watermark encoder 104 (FIGS. 1-4, and 8) and/or decoder 114 (FIG. 1) described above. In particular, FIGS. 5A and 5B depict a flow diagram representative of machine readable instructions that may be executed to implement the example content-aware watermark encoder 104 of FIGS. 1-4 and 8 to generate content-aware watermarks and embed the content-aware watermarks into media. FIG. 7 is a flow diagram representative of machine readable instructions that may be executed to implement the example content-aware watermark decoder 114 of FIGS. 1 and 6 to decode content-aware watermarks and generate media exposure counts to determine the number of times one or more audience members have been exposed to particular media compositions. FIG. 9 is a flow diagram representative of example machine readable instructions that may be executed to implement the search engine server 110 of FIG. 1 to find media compositions having watermark-embedded keywords matching provided search terms. FIG. 10 is a flow diagram representative of example machine readable instructions that may be executed to implement the data compressor 414 (FIG. 4) to encode keywords or partial keywords. FIG. 11 is a flow diagram representative of example machine readable instructions that may be executed to implement the keyword decoder 607 of FIG. 6 to decode keywords or partial keywords detected in content-aware watermarks. FIG. 12 is a flow diagram representative of example machine readable instructions that may be executed to implement a targeted advertising process using the content-aware watermarks described herein.

The example processes of FIGS. 5A, 5B, 7, and 9-12 may be performed using a processor, a controller and/or any other suitable processing device. For example, the example processes of FIGS. 5A, 5B, 7, and 9-12 may be implemented in coded instructions stored on a tangible medium such as a flash memory, a read-only memory (ROM) and/or random-access memory (RAM) associated with a processor (e.g., the example processor 1312 discussed below in connection with FIG. 13). Alternatively, some or all of the example processes of FIGS. 5A, 5B, 7, and 9-12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 5A, 5B, 7, and 9-12 may be implemented manually or as any combination(s) of any of the foregoing techniques, for example, any combination of firmware, software, discrete logic and/or hardware. Further, although the example processes of FIGS. 5A, 5B, 7, and 9-12 are described with reference to the flow diagrams of FIGS. 5A, 5B, 7, and 9-12, other methods of implementing the processes of FIGS. 5A, 5B, 7, and 9-12 may be employed. For example, the order of execution of the blocks may be changed, and/or some of the blocks described may be changed, eliminated, sub-divided, or combined. Additionally, any or all of the example processes of FIGS. 5A, 5B, 7, and 9-12 may be performed sequentially and/or in parallel by, for example, separate processing threads, processors, devices, discrete logic, circuits, etc.

Turning to FIG. 5A, initially the data interface 402 (FIG. 4) receives media composition data (block 502) from, for example, a media source. The data interface 402 then selects a portion of the media data (block 504) to process for generating a content-aware watermark. The example content-aware watermark encoder 104 then determines whether it should create audio track-based keyword(s) (block 506). For example, if a user sets a configuration option of the content-aware watermark encoder 104 to not generate audio track-based keyword(s) or if an audio track and/or closed caption text is not present or if a user sets a configuration option to only generate metadata-based keyword(s), the content-aware watermark encoder 104 will determine that it should not create audio track-based keywords (block 506) and control will advance to block 518.

If the example content-aware watermark encoder 104 determines that it should create audio track-based keyword(s) (block 506) (e.g., the content-aware watermark encoder is configured to create audio track-based keyword(s) and an audio track and/or closed caption text is present), the media features detector 410 (FIG. 4) determines whether the media data portion includes closed caption text (block 508). If the media data portion includes closed caption text (block 508), the closed caption text decoder 404 (FIG. 4) retrieves the closed caption text (block 510) from the media data such as, for example, the closed caption text 204 of FIG. 2.

If the media data portion does not include closed caption text (block 508), the speech-to-text converter 406 (FIG. 4) retrieves the audio track portion from the media data portion (block 512). FIG. 3 illustrates an example audio track portion as the audio track excerpt 308. The speech-to-text converter 406 then performs a speech-to-text conversion (block 514) on the audio track portion to generate a textual representation of the audio track portion. After performing the speech-to-text conversion (block 514) or after retrieving the closed caption text (block 510), the word selector 412 (FIG. 4) selects one or more keyword(s) (block 516) from the closed caption text retrieved at block 510 and/or the text generated at block 514. For example, to select the keyword(s), the word selector 412 may select words or phrases in the closed caption text or audio track portion indicative or descriptive of content in the media data portion and/or mentioned or presented in the media data portion. Additionally or alternatively, the word selector 412 may be configured to select words or phrases that might be of interest to a user searching for media content in, for example, servers coupled to the Internet (e.g., the media servers 102a-c coupled to the internetwork 112 of FIG. 1). The keywords may be selected by, for example, comparing words detected in the closed caption text or audio track portion to words of interest identified in the reference database 118 (FIGS. 1 and 8) (e.g., 'New York' may be pre-identified as a term of interest to be selected when found). The pre-selected keywords in the reference database 118 may be weighted with a numeric factor so if multiple terms in the reference database 118 are found in a portion of a media composition, the keywords used in connection with a content-aware watermark can be limited to the terms with the highest weights.

After the word selector 412 selects the keyword(s) at block 516, or if the content-aware watermark encoder 104 determined that it should not create audio track-based keywords (block 506), the example content-aware watermark encoder 104 then determines whether it should create metadata-based keyword(s) (block 518). For example, if a user sets a configuration option of the content-aware watermark encoder 104 to not generate metadata-based keyword(s) or if a user sets a configuration option to only generate audio track-based keyword(s), the content-aware watermark encoder 104 will determine that it should not create metadata-based keywords (block 518) and control will advance to block 530 (FIG. 5B).

If the example content-aware watermark encoder 104 determines that it should create metadata-based keyword(s) (block 518) (e.g., the content-aware watermark encoder is configured to create metadata-based keyword(s)), the metadata detector 408 (FIG. 4) determines whether metadata is present in the media data portion (block 520). If metadata is present, the metadata detector 408 retrieves the metadata from the media data portion (block 522).

If metadata is not present in the media data portion (block 520), the media features detector 410 (FIG. 4), detects media features (or characteristics) in the media data portion (block 524). For example, the media features detector 410 may detect media features specified in, for example, configuration settings of the content-aware watermark encoder 104. If the configuration settings specify that content-aware watermarks should include keywords indicative of blank frames, the media features detector 410 detects blank frames in the media portion at block 524. The media features detector 410 then generates metadata based on the features (or characteristics) detected at block 524.

After the media features detector 410 generates metadata based on the detected features (or characteristics) (block 524) or after the metadata detector 408 retrieves the metadata from the media data portion (block 522), the word selector 412 (FIG. 4) selects (or creates) one or more metadata keyword(s) indicative of the metadata (block 528). For example, a keyword for a blank frame may be written as a keyword 'BF012032' indicating a blank frame at timestamp 1:20:32. A blank frame content aware watermark could be embedded in the corresponding blank frame or in a frame preceding or following the blank frame. As with the keywords for the audio portion of the content, keywords indicative of metadata may be selected by referencing the reference database 118 storing preselected, weighted terms of contents.

After the metadata keyword(s) are selected (or created) (block 528) or if the content-aware watermark encoder 104 determines that it should not create metadata keywords (block 518), the content-aware watermark encoder 104 determines whether keyword(s) have been selected (or created) (block 530) (FIG. 5B). For example, if the content-aware watermark encoder 104 determined that it should not create audio track-based keyword(s) (block 506) and determined that it should not create metadata keyword(s) (block 518), the content-aware watermark encoder 104 determines that no keyword(s) have been selected (or created) (block 530).

If keyword(s) have been selected (or created) (block 530), the content-aware watermark encoder 104 determines whether it should use unique identifier(s) (block 532). For example, the content-aware watermark encoder 104 may be configured to encode unique identifiers (e.g., the unique identifiers 808 of FIG. 8) in content-aware watermarks as described above in connection with FIG. 8. If the content-aware watermark encoder 104 determines that it should use unique identifier(s) (block 532), the data interface 402 (FIG. 4) accesses the code book 804 (FIG. 8) to retrieve unique identifiers (block 534) corresponding to the keyword(s) selected at block 516 and/or block 528 of FIG. 5A.

The content-aware watermark encoder 104 determines whether it should compress the keyword(s) or the unique identifier(s) (block 536). For example, configuration settings of the content-aware watermark encoder 104 may indicate whether to compress keyword(s) or the unique identifier(s) and/or the content-aware watermark encoder 104 may be configured to compress the keyword(s) or the unique identifier(s) when they exceed a threshold value for the size and/or number of the keyword(s) or the unique identifier(s). If the content-aware watermark encoder 104 determines that it should compress the keyword(s) or the unique identifier(s) (block 536), the data compressor 414 (FIG. 4) compresses the keyword(s) or the unique identifier(s) (block 538). An example process that may be used to compress the keyword(s) is discussed below in connection with FIG. 10.

After the data compressor 414 compresses the keyword(s) or the unique identifier(s) (block 538) or if the content-aware watermark encoder 104 determines that it should not compress the keyword(s) nor the unique identifier(s) (block 536), the watermark encoder 416 (FIG. 4) encodes the keyword(s) or the unique identifier(s) in a watermark (block 540) to create a content-aware watermark (e.g., the content aware watermark 206 of FIG. 2 or the content aware watermark 306 of FIG. 3), and the watermark embedder 208 (FIGS. 2 and 3) embeds the content-aware watermark in the media composition (block 542). For example, the watermark embedder 208 can embed the content-aware watermark in the media data portion selected at block 504 and/or in any portion of the media data received at block 502.

After the watermark embedder 208 embeds the content-aware watermark in the media composition or if keyword(s) have not been selected (or created) (block 530), the content-aware watermark encoder 104 determines whether it should select another media data portion (block 544) for which to generate a content-aware watermark. In the illustrated example, if the content-aware watermark encoder 104 has not processed all of the media composition received at block 502, the content-aware watermark encoder 104 is configured to select another media data portion, in which case, the data interface 402 selects another media data portion (block 546) and control returns to block 506 of FIG. 5A for further processing as explained above. Otherwise, if the content-aware watermark encoder 104 determines that it should not select another media data portion (block 544) (e.g., the content-aware watermark encoder 104 has processed all of the media composition received at block 502 or a configuration setting of the content-aware watermark encoder 104 specifies to only generate content-aware watermarks for a particular portion of media compositions (e.g., the starting portion or the ending portion)), the data interface 402 (FIG. 4) stores the media composition data including the content-aware watermark in a data store (e.g., one of the media servers 102a-e of FIG. 1) (block 548), and the example process of FIGS. 5A and 5B is ended.

Turning to FIG. 7, the depicted example process can be used to decode content-aware watermarks and generate exposure counts for media compositions presented to audience members. In the illustrated example of FIG. 1, audience members of a household may consume media via the personal computer 110 and/or the television 122, and the content-aware watermark decoder 114 can decode content-aware watermarks in the media and determine exposure counts based on those content-aware watermarks.

Initially, the media interface 602 (FIG. 6) receives media composition data (block 702) having one or more embedded content-aware watermark(s). For example, the media interface 602 can receive media composition data from the personal computer 110 or the television 122 of FIG. 1. The watermark detector 604 (FIG. 6) detects one or more content-aware watermark(s) (block 704) from the media composition data. The data extractor 606 (FIG. 6) retrieves one or more (whole or partial) keyword(s) or unique identifier(s) from the content-aware watermark(s) (block 705). The keyword decoder 607 (FIG. 6) then determines whether it should decode any whole or partial keyword(s) (block 706). For example, if the whole or partial keyword(s) are encoded or compressed as discussed above in connection with the data compressor 414 of FIG. 4, the keyword decoder 607 can detect the encoding or compression status and determine that it should decode the whole or partial keyword(s) (block 706). If the keyword decoder 607 determines that it should decode the whole or partial keyword(s), the keyword decoder 607 decodes each of the whole or partial keyword(s) or unique identifier(s) (block 707). An example process that can be used to implement the operation of block 707 is described below in connection with FIG. 11.

The data interface 610 (FIG. 6) increments one or more exposure tally count(s) (block 708) for respective ones of the one or more keyword(s) or unique identifier(s) to indicate that one or more audience member(s) were exposed to the content represented by the exposure tally count(s). For example, if one of the exposure tally counts is representative of an exposure count for media content mentioning New York City, another one of the tally counts is representative of an exposure count for media content mentioning Bubblee brand, and another one of the tally counts is representative of an exposure count for media content mentioning soda, and if the media composition data received at block 702 included the example media excerpt 202, each of the exposure tally counts would be incremented by one. In systems that employ a people meter or other mechanism for identifying the audience member, the identity and/or demographic characteristics of the audience member(s) that were exposed to the media content represented by the keyword(s) are logged. Typically, the demographic data collection is done at the monitored media site.

In the illustrated example, the analysis server 116 at the central facility 108 can add the tally counts generated by the content-aware watermark decoder 114 to tally counts collected from other content-aware watermark decoders to develop media ratings based on audience sizes in combination with audience percentages exposed to particular media content represented by keywords associated with content-aware watermarks. For example, a rating metric may indicate that for an audience group or panel (e.g., a nationwide audience) of a particular size, 10% of that audience was exposed to media content featuring (e.g., mentioning or displaying) a 'Bubblee' brand product.

The content-aware watermark decoder 114 determines whether it should generate any signatures (block 708). For example, the content-aware watermark decoder 114 may have configuration settings specifying that it should generate signatures when metadata-based content-aware watermarks are present such as blank frame content-aware watermarks indicative of blank frame locations. If the content-aware watermark decoder 114 determines that it should generate one or more signature(s) (block 708), the signature generator 608 (FIG. 6) generates the signature(s) (block 710). For example, the signature generator 608 may generate one or more audio and/or video signatures for a location (or neighboring location(s)) in the media composition data indicated by a timestamp in a metadata keyword extracted at block 705.

After the signature generator 608 generates the signature(s) (block 710) or if the example content-aware watermark decoder 114 determines that it should not generate any signatures (block 708), the timestamp generator 612 generates one or more timestamp(s) (block 714) indicating the date and/or time at which the keyword(s) or unique identifier(s) were extracted and/or the signature(s) were generated. Typically, the timestamping is done at the monitored media site.

The data interface 610 stores the data (i.e., the keyword(s), unique identifier(s), timestamp(s), and/or signature(s)) in a memory (block 716) such as, for example, the memory 1324 or the memory 1325 of FIG. 13. The example content-aware watermark decoder 114 then determines whether to communicate the stored data (i.e., the keyword(s), unique identifier(s), timestamp(s), and/or signature(s)) to the central facility 108 (block 718). If the example content-aware watermark decoder 114 determines that it should not communicate the stored data to the central facility 108 (block 718), control passes back to block 702. Otherwise, the data interface 610 communicates the stored keyword(s), unique identifier(s), timestamp(s), and/or signature(s) to the central facility 108 (block 720). For example, the data interface 610 can retrieve the keyword(s), unique identifier(s), timestamp(s), and/or signature(s) and send the retrieved data to a communication interface (not shown) communicatively coupled to the central facility 108 via, for example, a network connection (e.g., the Internet), a telephone connection, etc. The example process of FIG. 7 is then ended.

Turning now to FIG. 9, the depicted example process can be used to implement the search engine server 110 of FIG. 1 to find media compositions having watermark-embedded keywords matching provided search terms. In the illustrated example, the media compositions may be stored on the server 110 or on any other server or computer communicatively coupled to the server 110 via, for example, the internetwork 112 (FIG. 1). In the illustrated example, the example process of FIG. 9 is described in connection with the content-aware watermark decoder 114 in the search engine server 110 shown in FIG. 1. Initially, the search engine server 110 receives one or more search term(s) (block 902) from, for example, a user through a web page interface. For example, a user may provide the search term 'Bubblee' to find any audio and/or video media compositions in which a 'Bubblee' brand product is mentioned or displayed. Additionally or alternatively, the search term(s) may include a metadata keyword indicative of, for example, a blank frame, a scene change, etc. at a particular temporal location of a media composition.

The search engine server 110 selects a first media composition (block 904) in which to search for the provided search term(s). The watermark detector 604 (FIG. 6) detects one or more content-aware watermarks in the media composition (block 906), and the data extractor 606 (FIG. 6) retrieves one or more keyword(s) from each of the content-aware watermarks (block 908). In example implementations, in which the keywords retrieved from the content-aware watermarks are compressed and/or character-bit encoded, the keyword decoder 607 (FIG. 6) may decode the keywords using, for example, the example process described below in connection with FIG. 11.

The search engine server 110 then determines if there is any match (block 910) between any of the search terms provided at block 902 and any of the keywords retrieved at block 908. If a match is found (block 910), the search engine server 110 creates (or retrieves) a network link (block 912) for the media composition. For example, the search engine server 110 can generate (or retrieve) a hypertext link, a uniform resource locator (URL) link, or any other type of network link to retrieve the media composition from its storage location.

After the search engine server 110 creates the network link (block 912) or if no match is found (block 910), the search engine server 110 determines whether it should search another media composition (block 914). For example, if the search engine server 110 has not completed searching all of the media compositions that it is aware of, the search engine server 110 will search another media composition. If the search engine server 110 determines that it should search another media composition (block 914), control passes back to block 904 and the search engine server 110 selects another media composition. If the search engine server 110 determines that it has finished searching and there is no other media composition to search (block 914), the search engine server 110 presents one or more network link(s) to media composition(s) (block 916) identified as having one or more keyword(s) matching the search terms provided at block 902. For example, the search engine server 110 may present the network links via a web page for a user. The example process of FIG. 9 is then ended.

Turning to FIG. 10, the depicted example process may be used to implement the data compressor 414 (FIG. 4) to encode whole keywords or partial keywords. The example process of FIG. 10 may be used in connection with the example process of FIGS. 5A and 5B to implement the compress operation of block 538 to compress whole or partial keywords. Initially, the data compressor 414 receives a keyword from the word selector 412 (block 1002). The data compressor 414 then determines whether it should form a partial keyword (block 1004). For example, if the data compressor 414 is configured to truncate keywords to a predetermined number of characters (e.g., five characters) and the keyword has more characters than the predetermined number of characters, the data compressor 414 will elect to truncate the keyword. Otherwise, if the keyword fewer or the same number of characters as the predetermined number of characters, the data compressor 414 will elect not to truncate, but instead will forward the whole, non-truncated keyword to the watermark encoder 416. In another example implementation in which the data compressor 414 is configured to omit certain predetermined characters (e.g., all vowels, certain vowels, certain consonants, a mix of certain vowels and certain consonants, etc.) from the keyword, and the keyword contains one or more of those predetermined characters, the data compressor 414 can elect to form a partial keyword by omitting those identified characters. Otherwise, if the keyword does not contain any of the predetermined characters, the data compressor 414 can elect not to form a partial keyword.

If the data compressor 414 determines that it should form a partial keyword (block 1004), the data compressor 414 forms a partial keyword (block 1006) based on the keyword obtained at block 1002. In the illustrated example, the data compressor 414 can form the partial keyword using any technique discussed above in connection with FIG. 4 including truncation and/or character omission. After the data compressor 414 forms the partial keyword (block 1006) or if the data compressor 414 determines that it should not form a partial keyword (block 1004), the data compressor 414 encodes the partial keyword or the whole keyword if no partial keyword was formed (block 1008). In the illustrated example, the data compressor 414 can encode the whole or partial keyword as discussed above in connection with FIG. 4 by encoding each character of the whole or partial keyword using a predetermined number of bits (e.g., five bits) to form a character-bit compressed whole or partial keyword. The data compressor 414 then determines whether it should encode another keyword (block 1010). For example, if the data compressor 414 determines that the word selector 412 has another keyword available for processing by the data compressor 414, control is passed back to block 1002 and the data compressor 414 performs the process of FIG. 10 again on the subsequent keyword. Otherwise, if another keyword is not available for processing, then the example process of FIG. 10 can end. Alternatively, the data compressor 414 can wait until another keyword is available at the word selector 412, at which point control can pass back to block 1002.

Turning to FIG. 11, the depicted example process may be used to implement the keyword decoder 607 (FIG. 6) to decode whole keywords or partial keywords detected in content-aware watermarks. The example process of FIG. 11 may be used in connection with the example process of FIG. 7 to implement the decode operation of block 707 to decode whole or partial keywords. Initially, the keyword decoder 607 receives a whole or partial keyword from the data extractor 606 (block 1102). The keyword decoder 607 then determines whether the whole or partial keyword is character-bit compressed (block 1104). For example, the whole or partial keyword is character-bit compressed if each character of the whole or partial keyword is encoded as discussed above in connection with FIG. 4 using relatively fewer bits (e.g., five bits) than those used for ASCII encoding. If the keyword decoder 607 determines that the whole or partial keyword is character-bit compressed (block 1104), the keyword decoder 607 decodes the whole or partial keyword to be represented using ASCII codes (block 1106).

After the keyword decoder 607 decodes the whole or partial keyword to ASCII format (block 1106) or if the keyword decoder 607 determines that the whole or partial keyword is not character-bit compressed (block 1104), the keyword decoder 607 determines if the keyword received at block 1102 and/or decoded at block 1106 is a partial keyword (block 1108). If the keyword is a partial keyword (block 1108), the keyword is a partial keyword (block 1108), the keyword decoder 607 reconstructs the partial keyword (block 1110) to form a whole keyword. In the illustrated example, the keyword decoder 607 reconstructs the keyword using a spell checker process as discussed above in connection with FIG. 6. After the keyword decoder 607 reconstructs the keyword (block 1110) or if the keyword decoder 607 determines that the keyword received at block 1102 and/or decoded at block 1106 is not a partial keyword (block 1108), the keyword decoder 607 communicates the whole keyword to the data interface 610 (FIG. 6) (block 1112). The keyword decoder 607 then determines whether it should decode another keyword (block 1114). For example, if the keyword decoder 607 determines that the data extractor 606 has another whole or partial keyword available for processing by the keyword decoder 607, control is passed back to block 1102 and the keyword decoder 607 performs the process of FIG. 11 again on the subsequent whole or partial keyword. Otherwise, if another whole or partial keyword is not available for processing, then the example process of FIG. 11 ends. Alternatively, the keyword decoder 607 can wait until another whole or partial keyword is available at the data extractor 606, at which point control can pass back to block 1102.

Turning now to FIG. 12, the depicted example process can be used to implement a targeted advertising process using the content-aware watermarks described herein. In the illustrated example, the example targeted advertising process of FIG. 12 can be implemented using the television media server 102*d* of FIG. 1 to analyze media compositions having watermark-embedded keywords matching keyword terms associated with different advertisements to present those advertisements in connection with media of similar subject matter. In this manner, the advertisements can be presented in a targeted manner to audience members that are relatively more likely to be interested in such advertisements based on their interest in watching or listening to particular media compositions. Although the example targeted advertising process is described in connection with television media, the targeted advertising process can be used in connection with audio media (e.g., radio media), web site media, or any other type of media via which advertisements can be presented.

In the illustrated example, the media compositions may be stored on the television media server 102*d*, the motion picture media server 102*e*, or on any other server communicatively coupled to the television server 102*d*. In this manner, when the television media server 102*d* is broadcasting or otherwise distributing media, the television media server 102*d* can perform the example process of FIG. 12 to analyze the broadcasting media to select relevant advertisements for presentation in connection with the media. In the illustrated example, the example process of FIG. 12 is described in connection with the content-aware watermark decoder 114 in the television media server 102*d* shown in FIG. 1.

Initially, the television media server 102*d* receives one or more keyword(s) (block 1202) provided by, for example, one or more advertisers. For example, advertisers may provide keywords that indicate media content that would be consumed by typical audiences that the advertiser would like to target for presenting advertisements associated with those keywords. The television media server 102*d* receives a media segment (block 1204) in which to search for the provided keyword(s). For example, prior to or during broadcasting of a media composition (made up of a plurality of media segments), the television media server 102*d* may analyze each media segment of the media composition to determine whether it includes content-aware watermarks having one or more of the keyword(s) provided at block 1202. The watermark detector 604 (FIG. 6) detects one or more content-aware watermark(s) in the media segment (block 1206), and the data extractor 606 (FIG. 6) retrieves one or more keyword(s) from the content-aware watermark(s) (block 1208). In example implementations, in which the keywords retrieved from the content-aware watermarks are compressed and/or character-bit encoded, the keyword decoder 607 (FIG. 6) may decode the keywords using, for example, the example process described above in connection with FIG. 11.

The television media server 102*d* then determines if there is any match (block 1210) between any of the keywords provided at block 1202 and any of the keywords retrieved at block 1208. If a match is found (block 1210), the television media server 102*d* selects an advertisement associated with the matched keyword(s) for presentation (block 1212) in association with the media segment or with some other media segment of the media composition.

After the television media server 102*d* selects an advertisement for presentation (block 1212) or if no match is found (block 1210), the television media server 102*d* determines whether it should analyze another media segment (block 1214). For example, if the television media server 102*d* has not completed analyzing all of the segments of the media composition, the search engine server 102*d* will search another media segment. If the television media server 102*d* determines that it should analyze another media segment (block 12), control passes back to block 1204 and the television media server 102*d* receives another media segment. If the television media server 102*d* determines that it has finished analyzing all of the media segments (block 1214), the example process of FIG. 12 is then ended.

FIG. 13 is a block diagram of an example processor system 1310 that may be used to implement the apparatus and methods described herein. As shown in FIG. 13, the processor system 1310 includes a processor 1312 that is coupled to an interconnection bus 1314. The processor 1312 may be any suitable processor, processing unit or microprocessor. Although not shown in FIG. 13, the system 1310 may be a multi-processor system and, thus, may include one or more additional processors that are identical or similar to the processor 1312 and that are communicatively coupled to the interconnection bus 1314.

The processor 1312 of FIG. 13 is coupled to a chipset 1318, which includes a memory controller 1320 and an input/output (I/O) controller 1322. As is well known, a chipset typically provides I/O and memory management functions as well as a plurality of general purpose and/or special purpose registers, timers, etc. that are accessible or used by one or more processors coupled to the chipset 1318. The memory controller 1320 performs functions that enable the processor 1312 (or processors if there are multiple processors) to access a system memory 1324 and a mass storage memory 1325.

The system memory 1324 may include any desired type of volatile and/or non-volatile memory such as, for example, static random access memory (SRAM), dynamic random access memory (DRAM), flash memory, read-only memory (ROM), etc. The mass storage memory 1325 may include any desired type of mass storage device including hard disk drives, optical drives, tape storage devices, etc.

The I/O controller 1322 performs functions that enable the processor 1312 to communicate with peripheral input/output (I/O) devices 1326 and 1328 and a network interface 1330 via an I/O bus 1332. The I/O devices 1326 and 1328 may be any desired type of I/O device such as, for example, a keyboard, a video display or monitor, a mouse, etc. The network interface 1330 may be, for example, an Ethernet device, an asynchronous transfer mode (ATM) device, an 802.11 device, a DSL modem, a cable modem, a cellular modem, etc. that enables the processor system 1310 to communicate with another processor system.

While the memory controller 1320 and the I/O controller 1322 are depicted in FIG. 13 as separate blocks within the chipset 1318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
    obtaining a plurality of words present in an audio track of a media composition, the plurality of words to be audible during playback of the audio track;
    selecting at least one of the words based on weight values for a plurality of terms respectively corresponding to the words, and the corresponding weight values of the at least one of the words being greater than a weight value of the ones of words which is not selected; and
    encoding the selected word in a watermark.
2. A method as defined in claim 1, further comprising associating the watermark with the media composition.

3. A method as defined in claim 1, wherein the media composition includes at least one of audio data or video data.

4. A method as defined in claim 1, wherein the selected word is indicative of a product name or a product type mentioned in the audio track.

5. A method as defined in claim 1, wherein obtaining the plurality of words comprises obtaining the plurality of words from closed caption text for the media composition.

6. A method as defined in claim 1, wherein obtaining the plurality of words comprises:
    performing a speech-to-text conversion to generate a textual representation of at least a portion of the audio track; and
    obtaining the plurality of words from the textual representation.

7. A method as defined in claim 1, wherein selecting the at least one word is further based on the at least one word being descriptive of content in the media composition.

8. A method as defined in claim 1, wherein selecting the at least one word is further based on the at least one word being a term for searching for the media composition in one or more servers.

9. A method as defined in claim 1, wherein encoding the word in the watermark comprises:
    at least one of truncating the word or omitting characters from the word to form a partial word; and
    encoding the partial word in the watermark.

10. A method as defined in claim 1, further comprising selecting metadata associated with the media composition, the metadata including spatial information defining a location on a screen at which visual information is displayed.

11. An apparatus, comprising:
    a data interface to receive a media composition;
    a word selector to select a first one of a plurality of words present in an audio track of the media composition, the plurality of words to be audible during playback of the audio track, the word selector to select the first word based on respective weight values for a plurality of terms respectively corresponding to the words, and a first one of the weight values corresponding to the first word being greater than a second weight value of a non-selected one of the words; and
    a watermark encoder to encode the selected word in a watermark.

12. An apparatus as defined in claim 11, further comprising a watermark embedder to associate the watermark with the media composition.

13. An apparatus as defined in claim 12, wherein the media composition and the associated watermark are to be broadcast to one or more media devices associated with one or more audience members.

14. An apparatus as defined in claim 11, wherein the media composition includes at least one of audio data or video data.

15. An apparatus as defined in claim 11, wherein the selected word is indicative of a product name or a product type mentioned in the media composition.

16. An apparatus as defined in claim 11, wherein the word selector is to obtain the plurality of words from closed caption text.

17. An apparatus as defined in claim 11, wherein the word selector is to obtain the plurality of words by:
    performing a speech-to-text conversion to generate a textual representation of at least a portion of the audio track; and
    obtaining the plurality of words from the textual representation.

18. An apparatus as defined in claim 11, wherein the word selector is to select the first word based on the first word being descriptive of content in the media composition.

19. An apparatus as defined in claim 11, wherein the word selector is to select the first word based on the first word being a term for searching for the media composition in at least one server.

20. An apparatus as defined in claim 11, further comprising a metadata detector to select metadata associated with the media composition, the metadata to include spatial information defining a location on a screen at which visual information is displayed.

21. A tangible machine accessible storage device or storage disc comprising instructions that, when executed, cause a machine to at least:
  obtain a plurality of words present in an audio track of a media composition, the plurality of words to be audible during playback of the audio track;
  select at least one of the words based on weight values for a plurality of terms respectively corresponding to the words, and the corresponding weight values of the at least one of the words being greater than a weight value of the ones of words which is not selected; and
  encode the selected word in a watermark.

22. A tangible machine accessible storage device or storage disc as defined in claim 21, further comprising instructions that, when executed, cause the machine to associate the watermark with the media composition.

23. A tangible machine accessible storage device or storage disc as defined in claim 21, wherein the media composition includes at least one of audio data or video data.

24. A tangible machine accessible storage device or storage disc as defined in claim 21, wherein the selected word is indicative of a product name or a product type mentioned in the media composition.

25. A tangible machine accessible storage device or storage disc as defined in claim 21, wherein the instructions cause the machine to obtain the plurality of words from closed caption text of the media composition.

26. A tangible machine accessible storage device or storage disc as defined in claim 21, wherein the instructions cause the machine to obtain the plurality of words by:
  performing a speech-to-text conversion to generate a textual representation of at least a portion of the audio track; and
  obtaining the plurality of words from the textual representation.

27. A tangible machine accessible storage device or storage disc as defined in claim 21, wherein the instructions cause the machine to select the at least one word based on the at least one word being descriptive of content in the media composition.

28. A tangible machine accessible storage device or storage disc as defined in claim 21, wherein the instructions cause the machine to select the at least one word based on the at least one word being a term for searching for the media composition one or more servers.

29. A tangible machine accessible storage device or storage disc as defined in claim 21, further comprising instructions that, when executed, cause the machine to select metadata associated with the media composition, the metadata to include spatial information defining a location on a screen at which visual information is displayed.

* * * * *